(12) United States Patent
Benzaia et al.

(10) Patent No.: US 10,802,938 B2
(45) Date of Patent: Oct. 13, 2020

(54) ACCESSORY SETTING SERVICE

(71) Applicant: AT&T Intellectual Property I, L.P., Atlanta, GA (US)

(72) Inventors: Thomas P. Benzaia, Sugarland, TX (US); Bernard S. Ku, Austin, TX (US); Lakshminarashimhan Naidu, Pearland, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 501 days.

(21) Appl. No.: 14/493,795

(22) Filed: Sep. 23, 2014

(65) Prior Publication Data

US 2016/0085566 A1    Mar. 24, 2016

(51) Int. Cl.
*G06F 11/30* (2006.01)
*G06F 11/34* (2006.01)
*G06F 9/445* (2018.01)

(52) U.S. Cl.
CPC ...... *G06F 11/3024* (2013.01); *G06F 9/44505* (2013.01); *G06F 11/3409* (2013.01)

(58) Field of Classification Search
CPC .......................... G06F 9/44505; G06F 11/3024
See application file for complete search history.

(56) References Cited

U.S. PATENT DOCUMENTS

| | | | | |
|---|---|---|---|---|
| 5,978,839 A * | 11/1999 | Okuhara | ............... | G06F 15/167 709/215 |
| 6,269,382 B1 * | 7/2001 | Cabrera | ............ | G06F 17/30082 |
| 6,427,174 B1 * | 7/2002 | Sitaraman | ........... | H04L 12/2856 709/213 |
| 7,958,276 B2 * | 6/2011 | Storey | .................... | G06F 9/4411 710/8 |
| 8,977,408 B1 * | 3/2015 | Cazanas | ................ | H04L 41/082 455/3.03 |
| 9,165,412 B2 * | 10/2015 | Gellatly | ................. | G07C 5/008 |
| 9,229,905 B1 * | 1/2016 | Penilla | ..................... | G06F 17/00 |
| 9,275,208 B2 * | 3/2016 | Protopapas | ............. | G06F 21/31 |
| 9,317,807 B1 * | 4/2016 | Staddon | .................... | G06N 5/04 |
| 9,694,770 B2 * | 7/2017 | Tobin | .................... | B60R 16/037 |
| 9,731,668 B2 * | 8/2017 | Gusikhin | .............. | B60R 16/037 |

(Continued)

FOREIGN PATENT DOCUMENTS

| | | | | |
|---|---|---|---|---|
| EP | 2629556 A1 * | 8/2013 | ............. | H04W 8/18 |
| JP | 2004206223 | 7/2004 | | |

(Continued)

*Primary Examiner* — Jaweed A Abbaszadeh
*Assistant Examiner* — Cheri L Harrington
(74) *Attorney, Agent, or Firm* — Hartman & Citrin LLC

(57) ABSTRACT

Concepts and technologies are disclosed herein for providing and using an accessory setting service. Accessory data can be received from a computing device in communication with an accessory. The accessory data can include a unique identifier associated with the accessory. Based upon the unique identifier, a determination can be made as to whether or not the accessory data relates to a new accessory. If the accessory data does not relate to a new accessory, settings data associated with the accessory can be generated and transmitted to a recipient. If the accessory data relates to the new accessory, accessory settings associated with the accessory can be identified and stored with the unique identifier as accessory settings data.

14 Claims, 9 Drawing Sheets

(56) References Cited

U.S. PATENT DOCUMENTS

| | | | |
|---|---|---|---|
| 2004/0098471 A1* | 5/2004 | Shima | H04L 12/24 709/221 |
| 2004/0229606 A1 | 11/2004 | Oshima et al. | |
| 2006/0080415 A1* | 4/2006 | Tu | H04L 67/1095 709/220 |
| 2006/0168627 A1* | 7/2006 | Zeinstra | H04M 1/6091 725/75 |
| 2006/0294257 A1 | 12/2006 | Kumano et al. | |
| 2007/0008973 A1 | 1/2007 | Galea | |
| 2007/0049198 A1* | 3/2007 | Walsh | H04M 1/6066 455/41.2 |
| 2008/0318518 A1* | 12/2008 | Coutinho | H04H 20/62 455/3.06 |
| 2009/0013260 A1* | 1/2009 | Martin | G11B 27/105 715/747 |
| 2011/0057778 A1* | 3/2011 | DeWitt | G08C 17/02 340/10.42 |
| 2011/0140840 A1* | 6/2011 | Hardacker | H04N 5/66 340/5.83 |
| 2011/0141511 A1* | 6/2011 | Milanski | G06F 3/1204 358/1.15 |
| 2012/0110151 A1* | 5/2012 | Moore | G06F 9/526 709/223 |
| 2012/0229250 A1* | 9/2012 | Lim | G06F 21/84 340/5.8 |
| 2013/0343566 A1* | 12/2013 | Triplett | H04N 21/23406 381/77 |
| 2014/0128021 A1* | 5/2014 | Walker | H04W 52/0212 455/405 |
| 2014/0169256 A1 | 6/2014 | Bradish et al. | |
| 2014/0240089 A1* | 8/2014 | Chang | G07C 9/00111 340/5.61 |
| 2014/0281664 A1* | 9/2014 | Dudai | G06F 11/0793 714/3 |
| 2014/0323113 A1* | 10/2014 | Cho | H04L 67/34 455/418 |
| 2014/0336785 A1* | 11/2014 | Asenjo | G05B 19/4185 700/17 |
| 2014/0337429 A1* | 11/2014 | Asenjo | H04L 65/403 709/204 |
| 2015/0055789 A1* | 2/2015 | Bernal Castillo | G10K 11/178 381/71.6 |
| 2015/0106475 A1* | 4/2015 | Tan | H04R 5/04 709/217 |
| 2015/0280678 A1* | 10/2015 | Teh | H03G 9/14 455/90.2 |
| 2015/0319038 A1* | 11/2015 | Spencer | H04L 41/0803 370/254 |

FOREIGN PATENT DOCUMENTS

| | | |
|---|---|---|
| JP | 2005136529 | 5/2005 |
| JP | 2006261939 | 9/2006 |

\* cited by examiner

ACCESSORY SETTING SERVICE

BACKGROUND

Over the past several years, the popularity and prevalence of mobile computing devices has increased dramatically. As a result of the rapid technological advances of these devices, functions once relegated to desktop computers, wireline telephones, and/or other types of devices have now become prevalent among mobile computing devices. Furthermore, because of the exploding popularity of the Internet and Internet-capable devices, these mobile computing devices can be employed by users for various reasons at almost any time.

Along with the increased popularity and utility of these devices has come a corresponding increased popularity, prevalence, and utility of accessories such as speakerphones, headsets, portable speakers, remote controls, and/or other devices for controlling and/or extending functionality of the mobile computing devices. Typically, an accessory such as a headset, or the like, is paired with a mobile communication device and used for a particular purpose. Some of these accessories have various options or settings that may be controlled on the accessory and/or on the mobile communication device.

Users sometimes may have multiple accessories for use with a particular mobile communication device or other computing device under different circumstances. For example, a user may use a first wireless headset with the mobile communication device in a vehicle, while the user may use a second wireless headset when exercising. The determination as to how or when to use a particular accessory can be based upon a quality of the accessory, features of the accessory, a cost to replace the accessory, volume capabilities, audio quality, or the like.

In some cases, multiple accessories may be of the same general type (e.g., headsets, portable speakers, or the like), but may not perform in an equivalent manner. For example, some speakers are manufactured such that those speakers may be louder than other speakers, may have a different frequency response, or the like. Furthermore, various headsets, remote controls, or the like, may have various feature sets that can vary from other headsets. As such, various accessories may not provide users with a consistent experience with their mobile computing devices under all circumstances.

SUMMARY

The present disclosure is directed to providing and/or interacting with an accessory setting service. The accessory setting service can be provided by a computing device such as a computer, workstation, or server that can execute an application or module to provide the functionality illustrated and described herein. The functionality of the accessory setting service can be invoked by a user or device via a function call, a service call, an application trigger, and/or other triggering conditions, for example. Upon detecting a connection between the computing device and the accessory (e.g., a computing device such as a mobile communication device and a wireless headset, or the like), the computing device can be configured via execution of the accessory setting application to capture information associated with the accessory. For example, the computing device can capture a unique identifier associated with the accessory such as a media access control ("MAC") address, a phone number, an account number, other identifiers, or the like.

The computing device can package the captured unique identifier and generate accessory data that includes at least the unique identifier. The accessory data also can include other information, in some instances, such as accessory information that identifies the accessory or type of accessory, user information that identifies a user or device identity, preferences or settings that define how the accessory is configured, and/or other information such as geographic location that defines a current geographic location of the device, network connection statistics describing network connectivity, combinations thereof, or the like. The computing device can transmit the accessory data to the accessory setting service, and the accessory setting service can determine if one or more settings or preferences associated with the accessory are stored by the accessory setting service. In some embodiments, the computing device also can store information at a local memory and can make this determination without generating and/or transmitting the accessory data.

The accessory setting service can analyze the accessory data and determine, based upon the accessory data, if any settings or preferences are associated with the accessory identified in the accessory data and/or if any settings or preferences associated with the accessory are stored. If the accessory setting service determines that no settings or preferences are stored, the accessory setting service can notify the computing device to that effect, and the computing device can interact with the accessory to obtain and/or capture settings or preferences. The settings and/or preferences can be submitted by the computing device as a future iteration of the accessory data, in some embodiments. If the accessory setting service identifies settings or options associated with the accessory, the accessory setting service can generate settings data that corresponds to the settings and/or preferences and provide the settings data to the computing device for application to the accessory and/or for use in interactions with the accessory. In some instances, for example, the computing device can obtain the settings data and configure the accessory in accordance with the determined settings and/or preferences.

In some embodiments, the accessory setting service also can analyze the accessory data and generate accessory settings data. The accessory settings data can capture and/or represent settings or preferences associated with any number of accessories. The accessory settings data can be stored by the accessory setting service for use in configuring multiple accessories for multiple users and/or for multiple devices. The accessory settings data can be stored in a format that can support querying and/or searching to enable settings or options for an accessory to be identified based upon a unique identifier, a device, a user, or other information.

In some embodiments, the accessory setting service also can analyze the accessory settings data to identify one or more trends or patterns associated with the accessory, the device, and/or the user. These trends can be represented by trend data and/or used to generate settings data. The accessory setting service can store the trend data that describes the trends and/or store the trend data as part of the accessory settings data, in some embodiments. The accessory settings data and/or the trend data can be used to generate settings data that defines one or more settings or options for an accessory, and this settings data can be provided to one or more devices such as the computing device when in communication with the accessory. The accessory settings data and/or the trend data also can be provided to one or more entities (e.g., device manufacturers, accessory manufacturers, or the like) for various purposes such as, for example, product improvements, upgrades, or the like. These and other aspects of the concepts and technologies described herein will be illustrated and described in more detail below.

According to one aspect of the concepts and technologies disclosed herein, a method is disclosed. The method can include detecting, at a processor executing an accessory setting application, a communication with an accessory, and identifying, by the processor, a unique identifier associated with the accessory. The processor can determine if settings associated with the accessory are stored. If a determination is made that the settings are stored, the processor can obtain the settings and apply the settings to the accessory. If a determination is made that the settings are not stored, the processor can determine accessory settings associated with the accessory and store the accessory settings with the unique identifier associated with the accessory.

In some embodiments, determining if the settings are stored can include generating accessory data including the unique identifier, transmitting the accessory data to an accessory setting service, and receiving, from the accessory setting service, settings data including the settings. In some embodiments, the accessory setting service can receive the accessory data, identify the unique identifier, determine if the accessory data corresponds to a new accessory, and if a determination is made that the accessory data does not correspond to the new accessory, generate the settings data and transmit the settings data to the processor.

In some embodiments, the accessory setting service can receive the accessory data, identify the unique identifier, determine if the accessory data corresponds to a new accessory, and if a determination is made that the accessory data corresponds to the new accessory, identify accessory settings represented by the accessory data and store accessory settings data that represents the accessory settings. In some embodiments, the accessory setting service can analyze the accessory settings data, identify a trend based upon the accessory settings data, generate trend data that represents the trend, and update the accessory settings data based upon the trend data.

In some embodiments, determining the accessory settings can include presenting a user interface including a user interface control via which the accessory settings are input. In some embodiments, the unique identifier can include a media access control address associated with the accessory. In some embodiments, storing the accessory settings can include generating accessory data including the unique identifier, and transmitting the accessory data to the accessory setting service. In some embodiments, detecting the communication can include detecting wireless communication with the accessory. In some embodiments, the accessory communicates using a wireless peer-to-peer protocol.

According to another aspect of the concepts and technologies disclosed herein, a system is disclosed. The system can include a processor and a memory. The memory can store computer-executable instructions that, when executed by the processor, cause the processor to perform operations. The operations can include receiving accessory data from a computing device in communication with an accessory. The accessory data can include a unique identifier associated with the accessory. The operations also can include determining, based upon the unique identifier, if the accessory data relates to a new accessory. If a determination is made that the accessory data does not relate to a new accessory, the operations can include generating settings data associated with the accessory and transmitting the settings data to a recipient. If a determination is made that the accessory data does relate to the new accessory, the operations can include identifying accessory settings associated with the accessory and storing accessory settings data including the accessory settings and the unique identifier.

In some embodiments, the computer-executable instructions, when executed by the processor, cause the processor to perform operations further including analyzing the accessory settings data, identifying a trend based upon the accessory settings data, generating trend data that represents the trend, and updating the accessory settings data based upon the trend data. In some embodiments, the computer-executable instructions, when executed by the processor, cause the processor to perform operations further including outputting the accessory settings data and the trend data to a manufacturer of the accessory. The trend can be selected from a group of trends that includes a user trend, a device trend, and an accessory trend. In some embodiments, the accessory communicates with the computing device using a wireless protocol, and the unique identifier can include a media access control address.

According to yet another aspect, a computer storage medium is disclosed. The computer storage medium can have computer-executable instructions stored thereon that, when executed by a processor, cause the processor to perform operations. The operations can include receiving accessory data from a computing device in communication with an accessory. The accessory data can include a unique identifier associated with the accessory. The operations also can include determining, based upon the unique identifier, if the accessory data relates to a new accessory. If a determination is made that the accessory data does not relate to a new accessory, then operations can include generating settings data associated with the accessory and transmitting the settings data to a recipient. If a determination is made that the accessory data does relate to the new accessory, the operations can include identifying accessory settings associated with the accessory and storing accessory settings data including the accessory settings and the unique identifier.

In some embodiments, the computer-executable instructions, when executed by the processor, cause the processor to perform operations further including analyzing the accessory settings data, identifying a trend based upon the accessory settings data, generating trend data that represents the trend, and updating the accessory settings data based upon the trend data. In some embodiments, the computer-executable instructions, when executed by the processor, cause the processor to perform operations further including outputting the accessory settings data and the trend data to a manufacturer of the accessory. The trend can be selected from a group of trends that includes a user trend, a device trend, and an accessory trend. In some embodiments, the accessory communicates with the computing device using a wireless protocol, and the unique identifier can include a media access control address.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
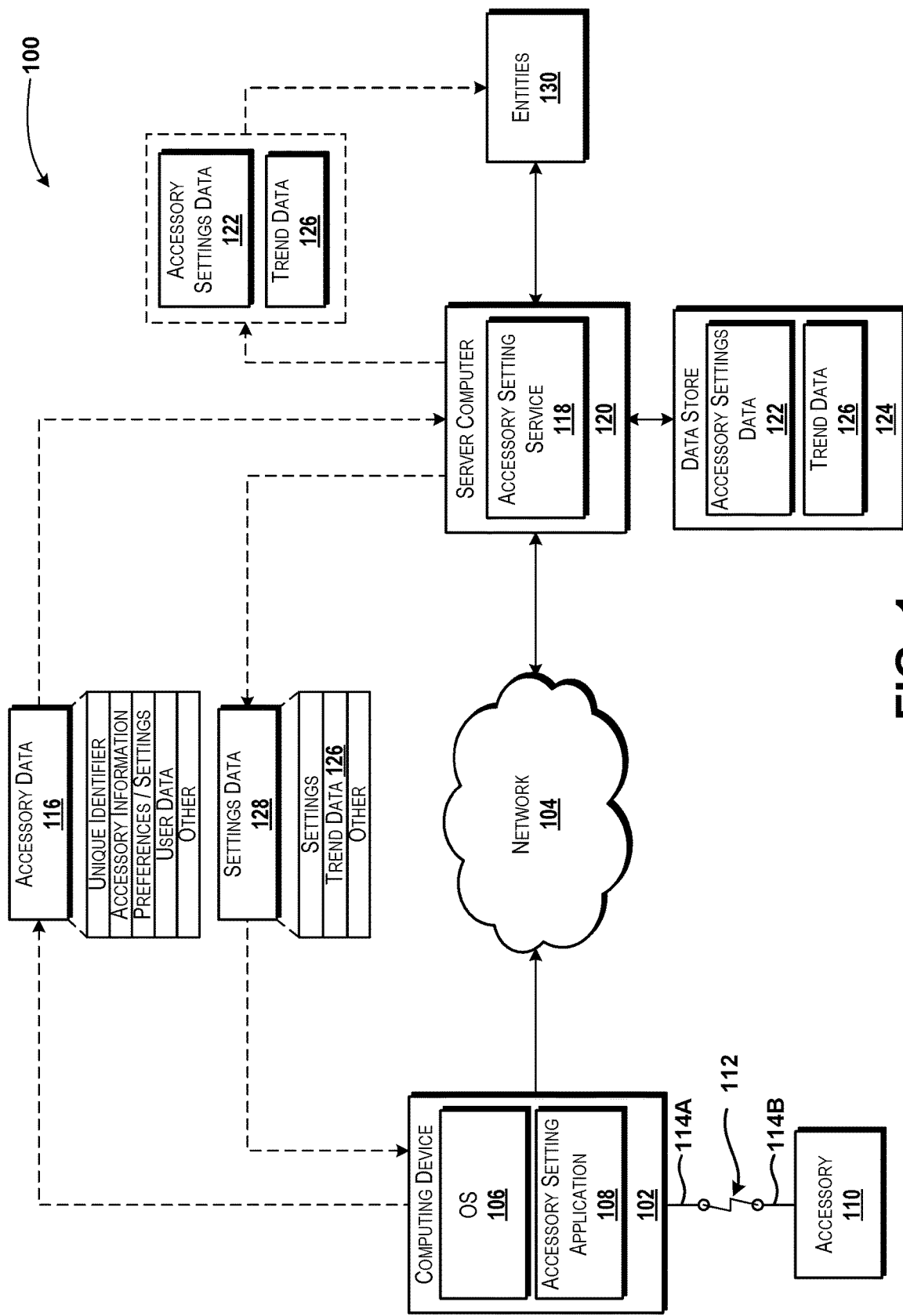
FIG. 1 is a system diagram illustrating an illustrative operating environment for various embodiments of the concepts and technologies described herein.

The following detailed description is directed to providing and/or interacting with an accessory setting service. The accessory setting service can be provided by a computing device such as a computer or server executing an application or module. The functionality of the accessory setting service can be invoked by a user or device and/or by a function call or application call, for example. Upon detecting a connection between the computing device and the accessory (e.g., a computing device such as a mobile communication device and a wireless headset, or the like), the computing device can be configured via execution of the accessory setting application to capture information associated with the accessory. For example, the computing device can capture a unique identifier associated with the accessory such as a MAC address, a user identifier, a phone number, or the like.

The computing device can package the captured unique identifier and generate accessory data that includes at least the unique identifier. The accessory data also can include other information such as accessory information that identifies the accessory or type of accessory; user information that identifies a user, account, or device; preferences or settings that define how an accessory is configured or interacted with; and/or other information such as geographic location, network connection statistics, or the like. The computing device can transmit the accessory data to the accessory setting service, and the accessory setting service can determine if one or more settings or preferences associated with the accessory are stored by the accessory setting service. In some embodiments, the computing device also can store information at a local memory and can determine if settings are stored for the accessory without generating and/or transmitting the accessory data to the accessory setting service.

The accessory setting service can analyze the accessory data and determine, based upon the accessory data, if any settings or preferences are associated with the accessory identified by the unique identifier included in the accessory data. If the accessory setting service determines that no settings or preferences are stored, the accessory setting service can notify the computing device to that effect, and the computing device can interact with the accessory to obtain and/or capture settings or preferences. If the accessory setting service identifies settings or options associated with the accessory, the accessory setting service can generate settings data that can correspond to the settings and/or preferences. The accessory setting service also can provide the settings data to the computing device. The computing device can obtain the settings data and configure the accessory in accordance with the determined settings and/or preferences.

In some embodiments, the accessory setting service also can analyze the accessory data and generate accessory settings data. The accessory settings data can capture settings or preferences associated with any number of accessories and can be stored by the accessory setting service for use in configuring accessories. In some embodiments, the accessory setting service also can analyze the accessory settings data to identify one or more trends or patterns associated with accessories, devices, and/or users. These trends can be represented by trend data and/or used to generate settings data. The accessory setting service can store the trend data that describes the trends and/or store the trend data as part of the accessory settings data, in some embodiments.

Settings data can be generated based upon the accessory settings data and/or the trend data and provided to devices such as the computing device to configure accessories in accordance with previous settings, based on trends that indicate how other users have configured this accessory and/or how accessories generally are configured when used by this user or this device, or the like. The accessory settings data and/or the trend data also can be provided to one or more entities for various purposes such as, for example, product improvements, upgrades, or the like. These and other aspects of the concepts and technologies described herein will be illustrated and described in more detail below.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing and/or interacting with an accessory setting service will be described, according to an illustrative embodiment. The operating environment 100 shown in FIG. 1 includes a computing device 102. The computing device 102 can operate in communication with and/or as a part of a communications network ("network") 104.

According to various embodiments, the functionality of the computing device 102 may be provided by one or more server computers, one or more desktop computers, one or more mobile telephones, one or more laptop computers, one or more tablet or slate computers, one or more set-top boxes, one or more embedded computing systems, one or more vehicle computing systems, one or more smartphones, one or more smartwatches, other computing systems, and the like. It should be understood that the functionality of the computing device 102 can be provided by a single device, by two similar devices, and/or by two or more dissimilar devices. For purposes of describing the concepts and technologies disclosed herein, the computing device 102 is described herein as a smartphone. It should be understood that this embodiment is illustrative, and should not be construed as being limiting in any way.

The computing device 102 can execute an operating system 106 and one or more application programs such as, for example, an accessory setting application 108. The operating system 106 can include a computer program for controlling the operation of the computing device 102. The accessory setting application 108 can include an executable program configured to execute on top of the operating system 106 to provide various functionality illustrated and described herein for controlling settings associated with accessories.

In particular, the accessory setting application 108 can be configured to provide various functions for detecting an accessory 110, identifying the accessory 110 using a unique identifier; storing settings and/or preferences associated with the computing device 102 and/or the accessory 110; and/or communicating with other devices, applications, and/or other entities to store and/or use data associated with the settings for the accessory 110. In various embodiments, the computing device 102 can communicate with the accessory 110 via a link 112.

The link 112 can be provided by a wireless or wired connection that can be supported by one or more connection mechanisms 114A, 114B. In the illustrated embodiment, the link 112 can be provided by a wireless connection such as a BLUETOOTH connection, a ZIGBEE connection, a WIFI connection, combinations thereof, or the like. As such, each of the connection mechanisms 114A, 114B can correspond to an antenna that enables communication over the link 112. It can be appreciated that if a wireless connection is used, the technology employed can rely on broadcast technologies and/or peer-to-peer technologies to support communications over the link 112. Because other technologies and/or protocols can be used to provide the link 112 illustrated in FIG. 1, it should be understood that these examples are illustrative and therefore should not be construed as being limiting in any way.

The accessory setting application 108 can identify the accessory 110, in some embodiments, using a media access control ("MAC") address. As is generally understood, a MAC address can include a unique identifier for a hardware device such as networking hardware. In the illustrated and described embodiments, the MAC address can be assigned to the accessory 110, and this MAC address can be used to identify the accessory 110. It should be understood that this example is illustrative and therefore should not be construed as being limiting in any way. Because MAC addresses, the various components of MAC addresses, and how the numbers are assigned and/or managed generally is understood, the MAC address and/or the formation and/or format thereof will not be further described herein.

In some embodiments, the accessory setting application 108 can monitor a connection between the computing device 102 and the accessory 110, such as the link 112, and capture one or more settings associated with the accessory 110. For example, in various embodiments the accessory 110 can include an audio accessory such as speakers, a headset, a handset, a remote control, a speaker system, combinations thereof, or the like. Thus, the accessory setting application 108 can be configured to manage one or more audio settings associated with the accessory 110. By way of example, the accessory setting application 108 can detect a volume setting associated with the accessory 110. By identifying the MAC address of the accessory 110, the accessory setting application 108 can store the setting (in this case the volume setting) as being associated with the accessory 110. When the accessory 110 is again connected to the computing device 102, the accessory setting application 108 can retrieve the audio setting by using the unique identifier, and can apply the retrieved audio setting to the accessory 110. It should be understood that this example is illustrative and therefore should not be construed as being limiting in any way.

According to various embodiments, the accessory setting application 108 can capture data that identifies the MAC address of the accessory 110 and/or other identifying information; accessory information data such as a manufacturer of the accessory 110, a serial number of the accessory 110, a date code associated with the accessory 110, or the like; one or more preferences or settings associated with the accessory 110 such as volume, balance, fade, equalization, or the like; user data that can identify a user or device associated with the accessory 110; other information such as geographic location information, account information, or the like; combinations thereof; or the like. The accessory setting application 108 can be configured to generate accessory data 116, which can include these and/or other data illustrated and described herein. The accessory setting application 108 can save the accessory data 116 at the computing device 102 and/or transmit the accessory data 116 to other devices, applications, and/or other entities as will be illustrated and described in more detail below.

In the illustrated embodiment, the accessory setting application 108 can be configured to transmit the accessory data 116 to an accessory setting service 118. The accessory setting service 118 can be a callable service or application executed and/or hosted by a computing device such as a server computer 120. Because the accessory setting service 118 can interact with other devices and/or applications, and because the accessory setting application 108 can provide the functionality illustrated and described herein in additional and/or alternative ways (other than and/or in addition to interacting with the accessory setting service 118), it should be understood that this example is illustrative and therefore should not be construed as being limiting in any way.

The accessory setting service 118 can be configured to analyze the accessory data 116, and generate accessory settings data 122 that corresponds to and/or includes the accessory data 116. In some embodiments, the accessory settings data 122 can be substantially identical to the accessory data 116. In some other embodiments, the accessory settings data 122 can include similar information, but may be indexed according to addresses of accessories, device identifiers, user identifiers, preferences and/or settings, combinations thereof, or the like. The accessory settings data 122 also can include information representing trends associated with usage of accessories 110 by users and/or at devices.

In particular, the accessory settings data 122 can reflect user trends, device trends, user preferences or settings, device preferences or settings, or the like. Thus, for example, the accessory settings data 122 can include an indication that any audio device (or an average audio device) attached to the computing device 102 is generally controlled in a similar manner, or the like. For example, if a particular user is hard of hearing in the right ear, the accessory settings data 122 may capture information that indicates a percentage by which the user typically boosts volume of a right ear or right side module as a trend or user preference. It can be appreciated that the accessory data 116 may indicate a boost to the right ear/side volume, but may not indicate such a trend or preference. Thus, it should be understood that the accessory settings data 122 can be similar or different from the accessory data 116.

The accessory setting service 118 can analyze the accessory data 116 and/or multiple instances of accessory data 116. The multiple instances of the accessory data 116 may be provided to the accessory setting service 118 at various times. For example, an instance of accessory data 116 may be created and/or provided by the computing device 102 each time a particular accessory 110 is connected to or disconnected from the computing device 102, each time the accessory setting application 108 is initiated or started, at various time intervals, and/or at other times and/or conditions. Thus, in some embodiments the computing device 102 can capture settings associated with an accessory 110 when the accessory 110 is used, and these settings can be saved when the accessory 110 is disconnected (at which time these settings will not be changed again during that session). Because the accessory data 116 can be provided at almost any time, it should be understood that these examples are illustrative and therefore should not be construed as being limiting in any way.

Based upon one or more instances of the accessory data 116, the accessory setting service 118 can generate the accessory settings data 122. The accessory settings data 122 can identify an accessory 110 using a unique identifier such as a MAC address; identify one or more settings associated with the accessory 110; identify a computing device 102 to which the one or more settings apply when the accessory 110 is connected to the computing device 102; user and/or device trends associated with one or more accessories 110; combinations thereof; or the like. It can be appreciated that a "user trend" or "device trend" can correspond to implied preferences associated with a user or device. Thus, for example, a user trend may indicate that a user prefers a particular equalization (e.g., boosting of high frequencies to compensate for high-frequency hearing loss, or the like), volume setting, balance setting, fade setting, or the like. Because other types of trends can be detected by the accessory setting service 118 and/or stored as part of the accessory settings data 122, it should be understood that these examples are illustrative and therefore should not be construed as being limiting in any way. Detecting trends and storing data reflecting the trends are illustrated and described in more detail below.

The accessory setting service 118 can be configured to store the accessory settings data 122 at a local memory or other data storage device, in some embodiments. In some other embodiments, the accessory setting service 118 can be configured to store the accessory settings data 122 at a remote data storage location or device such as, for example, a data store 124, or the like. The functionality of the data store 124 can be provided by a disk drive, by storage resources, by a network data storage device, and/or by one or more server computers or databases. According to various embodiments, the accessory settings data 122 can be stored with data or other information that can associate the accessory settings data 122 with a user, an account, a device, an accessory 110, or the like.

The accessory settings data 122 can be stored in a table, database, or other data structure that can support querying and/or other lookup operations. As such, the accessory settings data 122 can be searched or queried according to various aspects of the accessory settings data 122 and/or the accessory data 116 used to generate the accessory settings data 122. Thus, the accessory setting service 118 can identify relevant accessory settings data 122 based upon various aspects of the accessory data 116 such as, for example, an address associated with an accessory 110; a type, brand, model, manufacturer, date code, serial number, or other information describing the accessory 110; one or more preferences and/or settings associated with a user, device, or accessory 110; a user identifier and/or other user data; other information; combinations thereof; or the like. Because the accessory settings data 122 can be queried or searched based upon other information and/or considerations, it should be understood that these examples are illustrative and therefore should not be construed as being limiting in any way.

At various times, the accessory setting service 118 can analyze the accessory settings data 122. For example, the accessory setting service 118 can analyze the accessory settings data 122 to detect one or more trends associated with the accessory settings data 122. As used herein, "trends" can be used to refer to various types of trends associated with usage and/or settings for accessories 110. These trends can be detected and/or determined by the accessory setting service 118 to determine implicit preferences associated with a user, accessory 110, device, or other entity.

In particular, trends can be detected and/or determined by the accessory setting service 118 to detect and/or quantify how one or more accessories 110 tend to be adjusted and/or interacted with by a particular user, also referred to herein as "user trends," which are described in more detail below. The trends also can be detected and/or determined by the accessory setting service 118 to detect and/or quantify how a particular accessory 110 tends to be adjusted and/or interacted with by one or more users or groups of users, also referred to herein as "accessory trends," which are also described in more detail below. The trends also can be detected and/or determined by the accessory setting service 118 to detect and/or quantify how multiple accessories 110 may be adjusted and/or interacted with when using a particular device, also referred to herein as "device trends," which also are described in more detail below. Because additional and/or alternative types of trends are possible (e.g., location-based trends, time-of-day trends, demographic trends, or the like), it should be understood that these examples are illustrative and therefore should not be construed as being limiting in any way.

The above-described trends, as well as other trends, can be detected by the accessory setting service 118 during analysis of the accessory settings data 122. The accessory setting service 118 can generate trend data 126 that represents the determined trends. The trend data 126 can be stored at the data store 124 and/or used by the accessory setting service 118 for various purposes. In some embodiments, for example, the accessory setting service 118 can use the trend data 126 to adjust, determine, and/or suggest one or more accessory settings to a user or other entity. In some embodiments, for example, the accessory setting service 118 can generate settings data 128, which can include the trend data 126 and/or other information as explained below.

The settings data 128 can include settings for a particular accessory 110. Thus, for example, the computing device 102 can detect communication with the accessory 110, generate accessory data 116 that includes an identifier of the accessory 110 such as a MAC address, and transmit the accessory data 116 to the accessory setting service 118. The accessory setting service 118 can determine one or more settings associated with the accessory 110, for example by searching the accessory settings data 122 by using the MAC address or other identifier. The accessory setting service 118 can generate the settings data 128 based upon the determined settings, and transmit the settings data 128 to the computing device 102. In some embodiments, as explained above, the settings data 128 can be based upon and/or include trend data 126. Thus, the settings data 128 can include settings that are based upon detected trends, in some embodiments. It should be understood that these examples are illustrative and therefore should not be construed as being limiting in any way. Additional details of the trends are provided below, and these trends can be detected, represented by the trend data 126, and/or included in the settings data 128 and/or the accessory settings data 122.

The user trends can be generated and/or used to determine how a particular user tends to interact with multiple accessories 110. Thus, for example, settings associated with two or more accessories 110 can be analyzed to detect a pattern and/or trend associated with the user. For example, if accessory settings data 122 indicates that a first accessory 110 such as earbuds are adjusted by a user to boost a right ear volume by fifteen percent and a second accessory 110 such as headphones are adjusted by a user to boost the right ear volume by twenty percent, the accessory setting service 118 can determine, by analyzing the accessory settings data 122 to detect patterns and/or trends, that the user tends to boost volume of the right ear an average of seventeen-and-a-half percent. It should be understood that this example is illustrative and therefore should not be construed as being limiting in any way.

Various other user trends can be detected such as, for example, fade settings, balance settings, volume increases, volume decreases, equalization, or the like. In the case of equalization, the accessory setting service 118 may determine, for example, that a user tends to boost high frequencies, which can be a sign of high frequency hearing loss. Based upon this determination, the accessory setting service 118 can generate trend data 126 that represents the determined trend, e.g., that the user tends to boost high frequencies by a particular amount or a particular percentage. It should be understood that this example is illustrative and therefore should not be construed as being limiting in any way.

The device trends can be generated and/or used to determine how one or more users tend to interact with one or more accessories 110 at a particular device. Thus, for example, settings associated with two or more accessories 110 can be analyzed to detect a pattern and/or trend associated with the device. For example, if accessory settings data 122 indicates that a first accessory 110 such as external speakers are adjusted by one or more users of a device to make a particular adjustment, the accessory setting service 118 can determine, by analyzing the accessory settings data 122 to detect patterns and/or trends, that one or more users of the device tend to make a particular adjustment. Thus, the device trends can represent how multiple accessories 110 may be adjusted by users of a particular device. The difference between device trends and user trends is that the device trends can be associated with one or more users and/or one or more accessories 110, but only one device. The user trends may be associated with one or more devices and/or one or more accessories 110, but only one user. It should be understood that this example is illustrative and therefore should not be construed as being limiting in any way.

The accessory trends can be generated and/or used to determine how a particular accessory 110 tends to be interacted with by multiple users and/or multiple devices. Thus, for example, settings associated with a single type of accessory 110, a particular brand of accessory 110, a particular manufacturer of accessory 110, a particular model of accessory 110, a particular serial number range of accessory 110, and/or another group, subgroup, or specific identification of an accessory 110 can be analyzed to detect a pattern and/or trend associated with a particular accessory 110. For example, the accessory settings data 122 may indicate that multiple settings for an accessory 110 (e.g., settings specified at multiple devices and/or by multiple users) tend to have a particular pattern and/or trend. The accessory setting service 118 can determine, based upon the identified pattern and/or trend, that the accessory 110 has an associated setting trend or pattern. Thus, trends or patterns associated with the brand, model, serial number range, manufacturer, or other type of accessory 110 can be determined and used to create the trend data 126 and/or the settings data 128. It should be understood that this example is illustrative and therefore should not be construed as being limiting in any way.

According to various embodiments, the accessory setting service 118 can be configured to provide the accessory settings data 122 and/or the trend data 126 to one or more entities 130. The entities 130 can include, for example, a computer system or other hardware associated with a manufacturer of the accessory 110, a manufacturer of the computing device 102, or the like. Thus, the entities 130 can receive the accessory settings data 122 and/or the trend data 126 and use these data for various purposes such as product improvements, firmware updates, advertising, or the like.

In some embodiments, the entities 130 can issue the trend data 126 to the server computer 120 in addition to, or instead of, receiving the trend data 126 from the server computer 120. Thus, the entities 130 can issue the trend data 126 that reflects trends so that the accessory setting service 118 can push the settings data 128 to devices before using an accessory 110. Thus, the entities 130 can use the accessory setting service 118 to set settings of the accessory 110 before use, thereby improving customer experiences with the accessory 110. Thus, the accessory setting service 118 can be used as a way to improve performance of accessories 110 without issuing new firmware, or the like. It should be understood that these examples are illustrative and therefore should not be construed as being limiting in any way.

In practice, the functionality of the accessory setting service 118 can be invoked by a user or device such as the computing device 102 in response to detecting a connection between the computing device 102 and an accessory 110 and/or at other times. The functionality of the accessory setting service 118 also can be invoked by the accessory setting service 118 itself, for example by determining that analysis of the accessory settings data 122 is to be performed.

Upon detecting a connection between the computing device 102 and the accessory 110 (or other devices and/or other accessories 110), the computing device 102 can be configured via execution of the accessory setting application 108 to capture information associated with the accessory 110. For example, the computing device 102 can capture a unique identifier associated with the accessory 110 such as a MAC address or the like. The computing device 102 also can capture accessory information such as a brand name of the accessory 110, a manufacturer of the accessory 110, a model number of the accessory 110, a serial number or serial number range of the accessory 110, an accessory type of the accessory 110, and/or other information that identifies the accessory 110, the type of accessory 110, and/or a particular brand, model, serial number, or the like associated with the accessory 110.

The computing device 102 can package the captured unique identifier and accessory information and generate accessory data 116. The computing device 102 can transmit the accessory data 116 to the accessory setting service 118 to determine if one or more settings or preferences associated with the accessory 110 are stored by the accessory setting service 118. In some embodiments, the computing device 102 also can store information that indicates if settings are stored for a particular accessory 110 in a local memory, as some embodiments of the concepts and technologies described herein can rely upon local storage of accessory settings. As such, the communication between the computing device 102 and the accessory setting service 118 can, but does not necessarily, occur at this point in all embodiments.

The accessory setting service 118 can analyze the accessory data 116 and determine, based upon the accessory data 116, if any settings or preferences are associated with the accessory identified in the accessory data 116. If the accessory setting service determines that no settings or preferences are stored, the accessory setting service 118 can inform the computing device 102 to that effect, and the computing device 102 can interact with the accessory 110 to obtain and/or capture settings or preferences. The settings and/or preferences can be submitted by the computing device 102 as a future iteration of the accessory data 116, in some embodiments.

If the accessory setting service 118 identifies settings or options associated with the accessory 110, the accessory setting service 118 can generate settings data 128 that corresponds to the settings and/or preferences and provide the settings data 128 to the computing device 102. The computing device 102 can obtain the settings data 128 and configure the accessory 110 in accordance with the determined settings and/or preferences.

In some embodiments, the accessory setting service 118 also can analyze the accessory data 116 and generate accessory settings data 122. The accessory settings data 122 can capture settings or preferences associated with any number of accessories 110 and can be stored by the accessory setting service 118 for use in configuring accessories 110. Thus, if the accessory 110 has not been interacted with by the computing device 102, the accessory setting service 118 nonetheless can be configured to generate settings and/or preferences based upon trends and/or patterns associated with the accessory 110, the device, a user, and/or the like.

In some embodiments, the accessory setting service 118 can analyze the accessory settings data 122 to identify one or more trends or patterns associated with the accessory 110, the device, and/or the user. These trends can be represented by the trend data 126 and/or used to generate the settings data 128. The accessory setting service 118 can store the trend data 126 that describes the trends and/or store the trend data 126 as part of the accessory settings data 122, in some embodiments. The accessory settings data 122 and/or the trend data 126 can be provided to one or more entities 130 for various purposes such as, for example, product improvements, upgrades, or the like. These and other aspects of the concepts and technologies described herein will be illustrated and described in more detail below.

In some embodiments, the concepts and technologies described herein also can support updating stored settings such as the accessory settings data 122. Thus, for example, the computing device 102 can generate updated accessory data 116 at any time. For example, a user or other entity may change a setting associated with the accessory 110. In response to detecting the change (also referred to herein as an "update"), the computing device 102 can capture the updated settings, generate accessory data 116 that includes the updated settings, and transmit the updated accessory data 116 to the accessory setting service 118. The accessory setting service 118 can update the accessory settings data 122 for future use, if desired. As such, it can be appreciated that the concepts and technologies described herein can support creating settings, obtaining and applying settings, and/or updating stored settings for accessories 110.

FIG. 1 illustrates one computing device 102, one network 104, one accessory 110, one server computer 120, one data store 124, and one instance of the entities 130. It should be understood, however, that various implementations of the operating environment 100 can include zero, one, or more than one computing device 102; zero, one, or more than one network 104; zero, one, or more than one accessory 110; zero, one, or more than one server computer 120; zero, one, or more than one data store 124; and/or zero, one, or more than one entity or instance of the entities 130. As such, the illustrated embodiment should be understood as being illustrative, and should not be construed as being limiting in any way.

Figure 2:
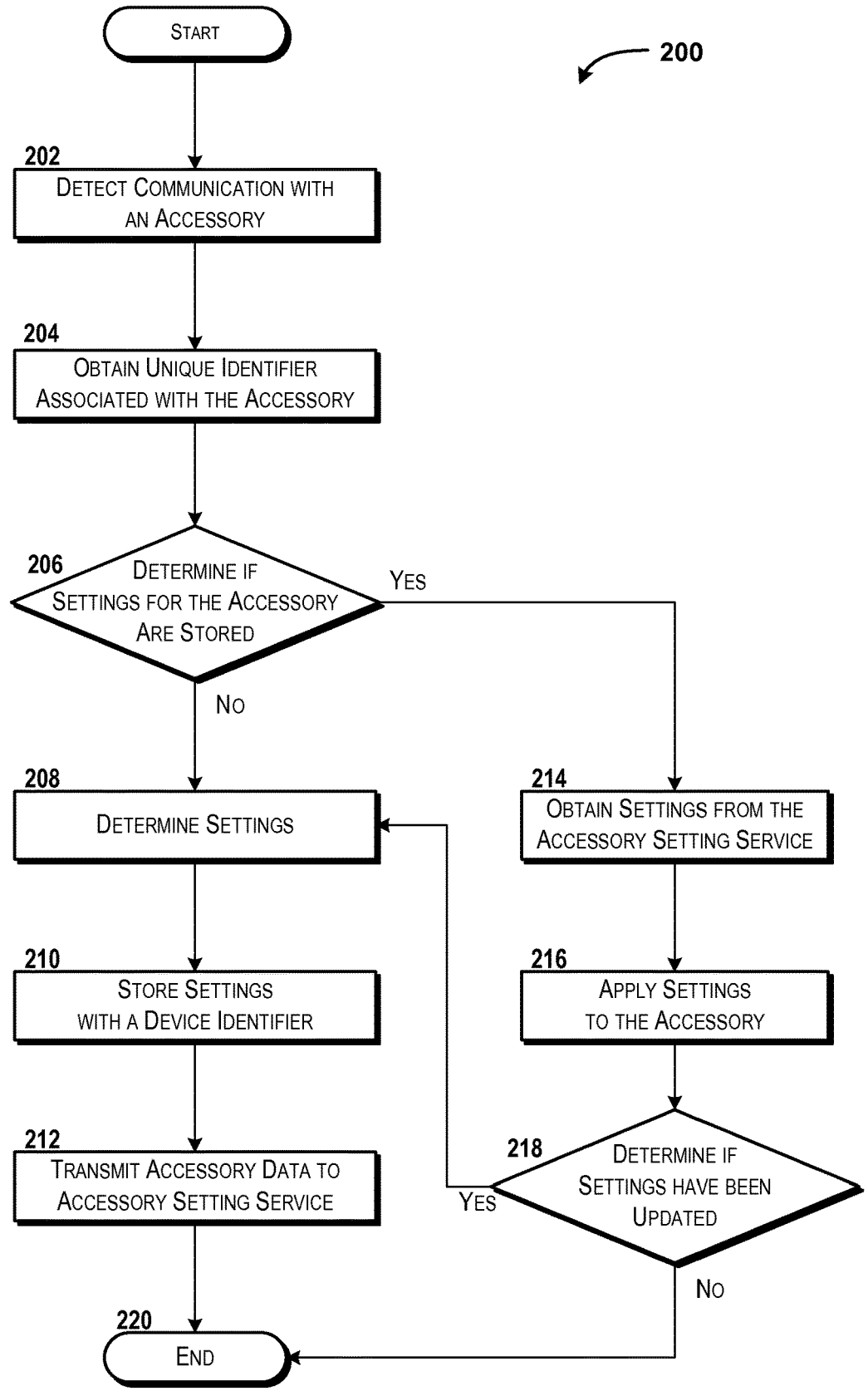
FIG. 2 is a flow diagram showing aspects of a method for storing and using accessory data, according to an illustrative embodiment of the concepts and technologies described herein.

Turning now to FIG. 2, aspects of a method 200 for storing and using accessory data 116 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device such as the computing device 102 and/or the server computer 120 to perform one or more operations and/or causing the processor to direct other components of the computing system or device to perform one or more of the operations.

For purposes of illustrating and describing the concepts of the present disclosure, the methods disclosed herein are described as being performed by the computing device 102 or the server computer 120 via execution of one or more software modules such as, for example, the accessory setting application 108 and/or the accessory setting service 118. It should be understood that additional and/or alternative devices and/or network nodes can provide the functionality described herein via execution of one or more modules, applications, and/or other software including, but not limited to, the accessory setting application 108 and/or the accessory setting service 118. Thus, the illustrated embodiments are illustrative, and should not be viewed as being limiting in any way.

The method 200 begins at operation 202. At operation 202, the computing device 102 detects a communication with an accessory 110. According to various embodiments, the computing device 102 can detect the communication with the accessory 110 via execution of the accessory setting application 108 or other software that can be configured to detect communications with the accessory 110. For example, the computing device 102 can be configured to detect pair requests and/or pairing operations, peer-to-peer session initialization actions or requests, communications, creation of a link such as the link 112, activation of the connection mechanisms 114A, 114B, creation of other data sessions associated with accessories 110, combinations thereof, or the like.

In some other embodiments, the computing device 102 can detect management of an accessory 110 using the accessory setting application 108 or other software. As such, it can be appreciated that the accessory setting application 108 can be configured to monitor communications occurring via the computing device 102 and/or connections with accessories 110. It should be understood that these examples are illustrative and therefore should not be construed as being limiting in any way.

From operation 202, the method 200 proceeds to operation 204. At operation 204, the computing device 102 can obtain a unique identifier associated with the accessory 110 with which communications have been detected in operation 202. According to various embodiments, the computing device 102 can obtain or identify a unique identifier such as a MAC address associated with the accessory 110. Other embodiments are possible and are contemplated, but in various embodiments the MAC address can be used because the MAC address can be interpreted to identify a manufacturer of the accessory 110 and/or other information associated with the accessory 110, yet can be unique with regard to other MAC addresses. It should be understood that this example is illustrative and therefore should not be construed as being limiting in any way.

In some other embodiments, the unique identifier identified in operation 202 can correspond to a service set identifier ("SSID") broadcast by WiFi hardware included in the accessory 110, a serial number associated with the accessory 110, an international mobile equipment identity ("IMEI") associated with the accessory 110, an international mobile subscriber identity ("IMSI") associated with the accessory 110, a user identifier associated with the accessory 110, an account number associated with the accessory 110, a phone number associated with the accessory 110, combinations thereof, or the like. As noted above, MAC addresses can be used in some embodiments. Because other types of unique identifiers are possible and are contemplated, it should be understood that these examples are illustrative and therefore should not be construed as being limiting in any way.

From operation 204, the method 200 proceeds to operation 206. At operation 206, the computing device 102 can determine if settings for the accessory 110 are stored. According to various embodiments, the computing device 102 can determine if settings for the accessory 110 are stored by analyzing locally stored data and/or by interacting with an accessory setting service 118. For example, the computing device 102 can be configured to store an indication or other data that can identify accessories 110 and indicate if settings or options for the accessory 110 are locally and/or remotely stored. In some embodiments, the computing device 102 can analyze locally stored data and determine, based upon the locally stored data, if the settings or options for the accessory 110 are or are not stored. It should be understood that this example is illustrative and therefore should not be construed as being limiting in any way.

In some other embodiments, the computing device 102 can communicate with the accessory setting service 118 to determine if settings or options for the accessory 110 are stored. For example, the computing device 102 can capture a unique identifier such as address data or other unique identifiers that can identify the accessory 110 (e.g., a MAC address, a hash, a serial number, or the like), and transmit accessory data 116 to the accessory setting service 118. The accessory setting service 118 can respond to the accessory data 116 with settings data 128 (e.g., if the settings are stored) or an indication that settings or options are not stored. Although not illustrated in FIGS. 1-2, it should be understood that the computing device 102 can receive an indication or other data from the accessory setting service 118, where the indication or other data can indicate that settings or options are not stored. It should be understood that this example is illustrative and therefore should not be construed as being limiting in any way.

If the computing device 102 determines, in operation 206, that the settings or options are not locally or remotely stored for the accessory 110, the computing device 102 can determine that the accessory 110 is new, has not yet been paired with the computing device 102, and/or that any previous settings or options have been deleted, or the like. Thus, the computing device 102 can determine that settings for the accessory 110 are to be configured and/or captured in response to a negative determination at operation 206, in some embodiments. It should be understood that this example is illustrative and therefore should not be construed as being limiting in any way.

If the computing device 102 determines, in operation 206, that the settings for the accessory 110 are not stored, the method 200 can proceed to operation 208. At operation 208, the computing device 102 can determine one or more settings associated with the accessory 110. The settings associated with the accessory (also referred to herein as "accessory settings") can be determined in various manners. In some embodiments, the computing device 102 can present available settings and capture input at the computing device 102 based upon interactions with the display. In some other embodiments, the computing device 102 can communicate with the accessory 110, and settings or options can be configured at the accessory 110 and transmitted to the computing device 102. Because settings or options associated with an accessory 110 can be set in additional and/or alternative ways, and because the settings or options can be captured at the computing device 102 in various manners, it should be understood that these examples are illustrative and therefore should not be construed as being limiting in any way.

From operation 208, the method 200 proceeds to operation 210. At operation 210, the computing device 102 can store the settings determined in operation 208. According to various embodiments of the concepts and technologies described herein, the settings associated with the accessory 110 can be stored locally at the computing device 102. According to some other embodiments, the settings associated with the accessory 110 can be transmitted to a remote device such as the server computer 120 for remote storage of the settings and/or options. It should be understood that various features described herein for determining trends associated with settings, users, devices, or the like, may benefit from storage of the settings associated with the accessory 110 at a remote device such as the data store 124.

In yet other embodiments, the settings associated with the accessory 110 can be stored at both the computing device 102 and a remote device such as the data store 124 accessible by the server computer 120. Thus, some embodiments of the concepts and technologies described herein enable the computing device 102 to access the settings associated with the accessory 110 locally and/or use and/or analysis of the settings associated with the accessory 110 as illustrated and described herein with reference to various embodiments of the concepts and technologies described herein.

From operation 210, the method 200 proceeds to operation 212. At operation 212, the computing device 102 can transmit the accessory data 116 to the accessory setting service 118. It can be appreciated that in some embodiments of the concepts and technologies described herein, the settings associated with the accessory 110 may be stored only locally at the computing device 102, and as such, that operation 212 can be omitted. In some other embodiments, as explained above with reference to operation 210, the settings associated with the accessory 110 can be stored at both the computing device 102 and a remote device such as the server computer 120.

Still further, the settings associated with the accessory 110 can be stored only at the accessory setting service 118, and as such, operation 210 can be omitted in some embodiments. Thus, according to various embodiments of the concepts and technologies described herein, the method 200 can include both of operations 210-212, or omit one of the operations 210-212. It should be understood that this example is illustrative and therefore should not be construed as being limiting in any way. Description of the method 200 now returns to operation 206.

If the computing device 102 determines, in operation 206, that settings for the accessory 110 are stored and/or are accessible, the method 200 can proceed to operation 214. At operation 214, the computing device 102 can obtain the settings associated with the accessory 110. According to various embodiments, the settings associated with the accessory 110 can be retrieved from a local storage device and/or from an external source such as, for example, the accessory setting service 118.

According to various embodiments of the concepts and technologies described herein, the computing device 102 can generate accessory data 116 that includes at least a unique identifier for the accessory 110. The unique identifier can be formatted, in various embodiments, as address data that can represent a MAC address, or the like. The computing device 102 can transmit the accessory data 116 to the accessory setting service 118. The accessory setting service 118 can query or otherwise search the accessory settings data 122 to identify one or more settings, options, preferences, and/or trends associated with the accessory 110.

The accessory setting service 118 can generate settings data 128 and respond to the computing device 102 with the settings data 128. Additional details of how the accessory setting service 118 generates and/or provides the settings data 128 are illustrated and described in more detail below with reference to FIGS. 3-4. Because the settings and/or options can be obtained by the computing device 102 in additional and/or alternative ways, it should be understood that this example is illustrative and therefore should not be construed as being limiting in any way.

From operation 214, the method 200 proceeds to operation 216. At operation 216, the computing device 102 can apply the settings obtained in operation 214 to the accessory 110. In some embodiments, such as the example embodiment illustrated in FIG. 1, the computing device 102 can obtain the settings as the settings data 128. Thus, operation 216 can correspond to the computing device 102 receiving the settings data 128, determining one or more settings represented by the settings data 128, and applying the settings to the accessory 110. Because the settings data 128 and/or other representations of the settings can be obtained and/or applied to the accessory 110 in various manners including the various embodiments illustrated and described herein, it should be understood that this example is illustrative and therefore should not be construed as being limiting in any way.

From operation 216, the method 200 proceeds to operation 218. At operation 218, the computing device 102 can determine if the settings associated with the accessory 110 have been updated. It should be understood that the determination relating to updating settings can be made at any time after application of the settings to the accessory 110 as illustrated and described herein with reference to operation 216. Thus, for example, the computing device 102 can be configured to check the settings associated with the accessory 110 when the accessory 110 is disconnected, turned off, or in response to other events.

In some embodiments, the computing device 102 can present a user interface that can include a UI control. When selected, the UI control can prompt the computing device 102 to store updated settings associated with the accessory 110. The computing device 102 can generate accessory data 116 based on the updated settings and transmit the accessory data 116 to the accessory setting service 118 as illustrated and described herein at operations 208-212. Additionally, or alternatively, the computing device 102 can store the updated settings locally as explained herein.

As such, if the computing device 102 determines, at operation 218, that the settings associated with the accessory 110 have been updated, the method 200 can return to operation 208, wherein the computing device 102 can determine and store settings, and provide accessory data 116 to the accessory setting service 118. If the computing device 102 determines, at operation 218, that the settings associated with the accessory 110 have not been updated, the method 200 can proceed to operation 220. It should be understood that the functionality illustrated and described herein for storing updated settings can be performed at any time, and need not be included as part of the method 200. Thus, the illustrated embodiment should be understood as being illustrative and should not be construed as being limiting in any way.

The method 200 also can proceed to operation 220 from operation 212. The method 200 ends at operation 220.

Figure 3:
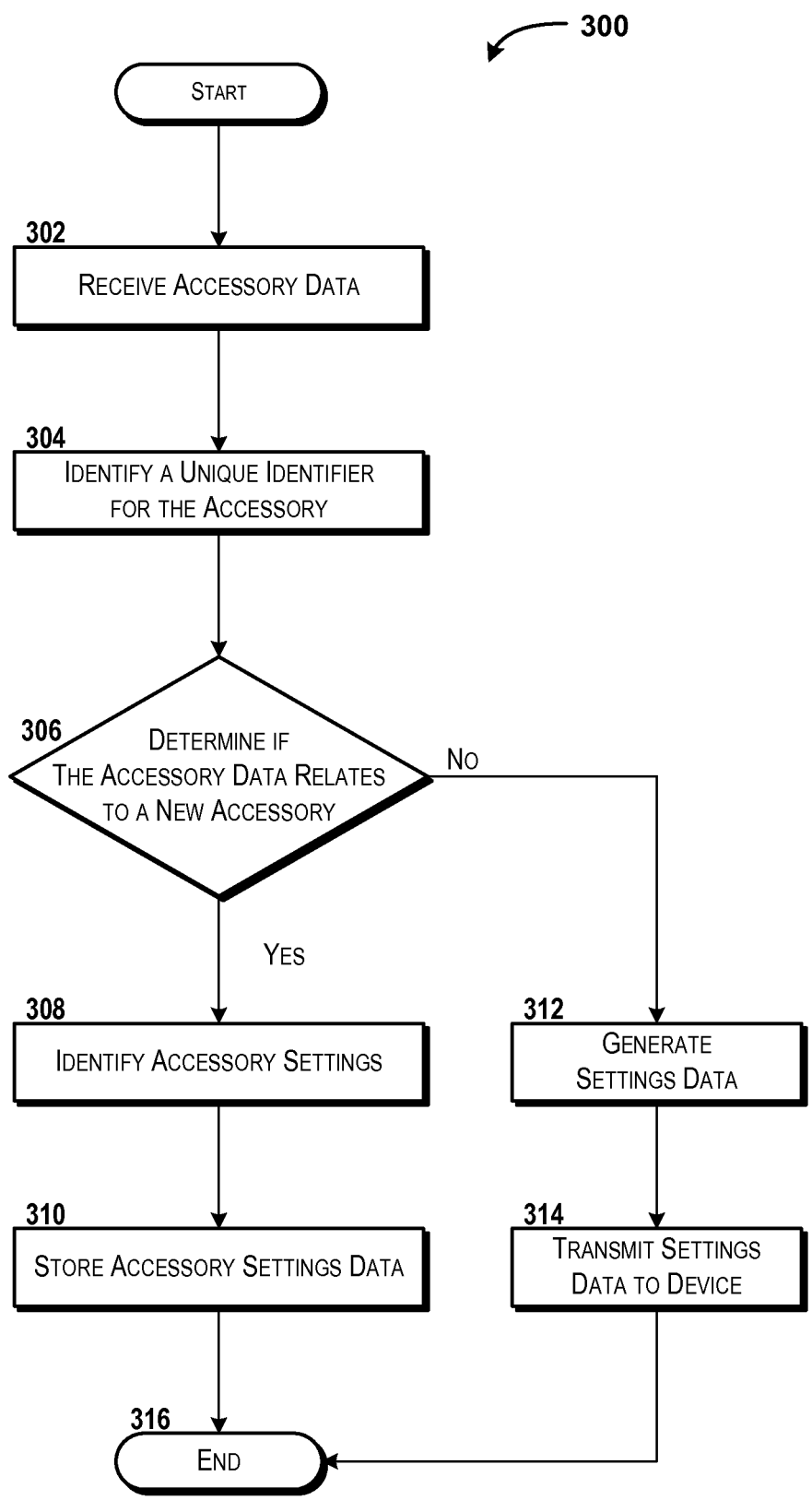
FIG. 3 is a flow diagram showing aspects of a method for storing and providing accessory data, according to an illustrative embodiment of the concepts and technologies described herein.

Turning now to FIG. 3, aspects of a method 300 for storing and using accessory data 116 will be described in detail, according to an illustrative embodiment. The method 300 begins at operation 302. At operation 302, the server computer 120 can receive accessory data 116. According to various embodiments, the server computer 120 can receive the accessory data 116 from a device such as the computing device 102, though this is not necessarily the case.

According to various embodiments, as illustrated and described in detail above, the accessory data 116 can include a unique identifier for an accessory 110 such as address data, or the like. In some embodiments, the unique identifier for the accessory can be provided by a MAC address, though this is not necessarily the case. In some instances, the accessory data 116 received in operation 302 can correspond to an accessory 110 for which accessory data 116 has previously been received, and as such, the accessory data 116 received in operation 302 can include the unique identifier only.

In some other embodiments, the accessory data 116 received in operation 302 can correspond to a new accessory 110 for which accessory data 116 has not been previously received and/or for which any associated data has been deleted or unlinked from the accessory 110. As such, it can be appreciated that the accessory data 116 received in operation 302 can be received for purposes of registering a new accessory 110 with the accessory setting service 118, for purposes of obtaining existing settings or options for the accessory 110, for purposes of obtaining or identifying one or more trends associated with the accessory 110, combinations thereof, or the like.

From operation 302, the method 300 proceeds to operation 304. At operation 304, the server computer 120 can identify a unique identifier for the accessory 110 associated with the accessory data 116 received in operation 302. The unique identifier can be included as a field in the accessory data 116, as a flag in the accessory data 116, and/or as other information included within or with the accessory data 116. Thus, it should be understood that the unique identifier can be obtained or identified in a number of manners. Regardless of how the unique identifier is identified, it should be understood that the unique identifier can correspond to address data or hardware identifiers for the accessory 110 such as a MAC address, a serial number, or the like. As such, operation 304 can correspond to determining a MAC address for the accessory 110 associated with the accessory data 116 obtained in operation 302, though this is not necessarily the case. It should be understood that this example is illustrative and therefore should not be construed as being limiting in any way.

From operation 304, the method 300 proceeds to operation 306. At operation 306, the server computer 120 can determine if the accessory data 116 relates to a new accessory 110. As used herein, a "new" accessory 110 can correspond to an accessory 110 for which settings or options are not stored as part of the accessory settings data 122. Thus, the determination that an accessory is "new" can correspond to determining that settings or options associated with the accessory 110 have not been stored, have been deleted, and/or are otherwise not available. It should be understood that this example is illustrative and therefore should not be construed as being limiting in any way.

If the server computer 120 determines, in operation 306, that the accessory data 116 relates to a new accessory 110, the method 300 can proceed to operation 308. In operation 308, the server computer 120 can identify one or more settings associated with the accessory 110. According to various embodiments, the server computer 120 can analyze the accessory data 116 to identify one or more settings or preferences associated with the accessory 110. According to various embodiments, the server computer 120 can identify accessory information such as a brand, model, serial number or serial number range, name, or the like; preferences or settings generated by a device or user associated with the accessory 110 and/or a device in communication with the accessory 110; user data such as a name, account number, or the like; and/or other information such as geographic location information, a business or entity at which the accessory 110 is located, an owner associated with the accessory 110, or the like; combinations thereof; or the like.

From operation 308, the method 300 proceeds to operation 310. At operation 310, the server computer 120 can store accessory settings data 122. The accessory settings data 122 can be generated by the server computer 120 based upon the accessory data 116, and can be stored in a searchable format. Thus, in some embodiments the server computer 120 can generate a table or database (or records therefor) relating to the accessory data 116 and store that information in operation 310. As illustrated and described above with reference to FIG. 1, the accessory settings data 122 can be stored at the server computer 120 and/or at a remote data storage device such as the data store 124. It should be understood that this example is illustrative and therefore should not be construed as being limiting in any way. Description of the method 300 now returns to operation 306.

If the server computer 120 determines, in operation 306, that the accessory data 116 does not relate to a new accessory 110, the method 300 can proceed to operation 312. Thus, it can be appreciated that the operations 302-306 can correspond to the server computer 120 receiving a request for settings or options for the accessory 110. It should be understood that this example is illustrative and therefore should not be construed as being limiting in any way.

In operation 312, the server computer 120 can generate settings data 128. In operation 312, the server computer 120 can access the accessory settings data 122 and identify one or more options or settings associated with the accessory 110. Although illustrated separately in FIG. 1, it should be understood that the accessory settings data 122 can include trend data 126. Thus, it should be recalled that the settings data 128 determined in operation 312 can include and/or can represent one or more trends. Thus, the settings data 128 generated in operation 312 can include user trends, device trends, and/or accessory trends as illustrated and described above with reference to FIG. 1.

From operation 312, the method 300 proceeds to operation 314. At operation 314, the server computer 120 can transmit the settings data 128 to a device. According to various embodiments, the settings data 128 can be transmitted to a device from which the accessory data 116 was received or obtained in operation 302. Thus, it can be appreciated that operations 302-306 and 312-314 can correspond to the computing device 102 detecting communication with an accessory 110, transmitting a unique identifier for the accessory 110 to the accessory setting service 118, and obtaining one or more settings from the accessory setting service 118. It should be understood that this example is illustrative and therefore should not be construed as being limiting in any way.

From operation 314, the method 300 proceeds to operation 316. The method 300 also can proceed to operation 316 from operation 310. The method 300 ends at operation 316.

Figure 4:
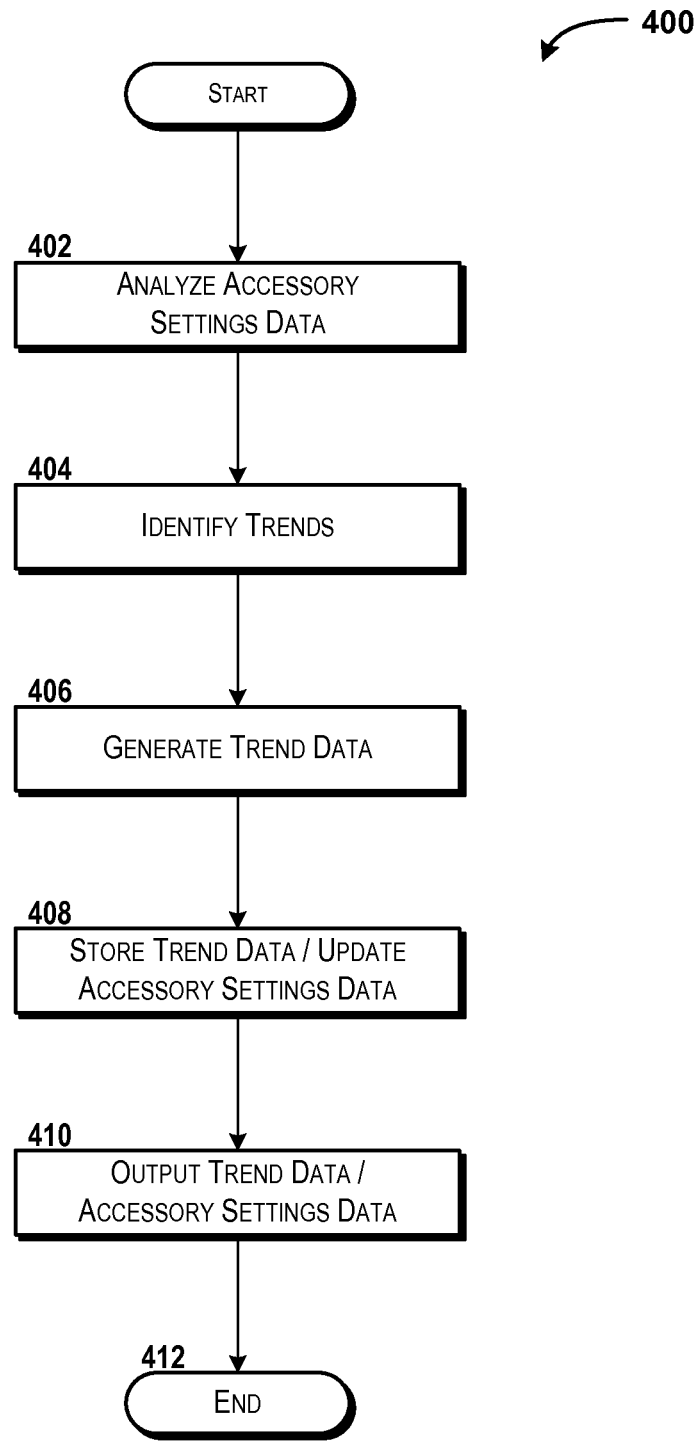
FIG. 4 is a flow diagram showing aspects of a method for analyzing accessory settings data, according to an illustrative embodiment of the concepts and technologies described herein.

Turning now to FIG. 4, aspects of a method 400 for analyzing accessory settings data 122 will be described in detail, according to an illustrative embodiment. The method 400 begins at operation 402. At operation 402, the server computer 120 can analyze the accessory settings data 122. The analysis of the accessory settings data 122 can be prompted by a request for settings or options for an accessory 110, by a function or application trigger, by expiration of a time counter (e.g., the accessory setting service 118 can be configured to periodically analyze the accessory settings data 122), and/or by other considerations.

In some embodiments, the functionality illustrated and described herein with reference to operation 402 can be performed by the server computer 120 at operation 312 of the method 300 illustrated and described with reference to FIG. 3, though this is not necessarily the case. In some embodiments, the accessory settings data 122 can be analyzed in response to a request from an entity such as a device manufacturer; a manufacturer, retailer, or reseller of an accessory 110; a user; a network operator; combinations thereof; or the like. Because the accessory settings data 122 can be analyzed at additional and/or alternative times, it should be understood that these examples are illustrative and therefore should not be construed as being limiting in any way.

From operation 402, the method 400 proceeds to operation 404. At operation 404, the server computer 120 can identify one or more trends associated with the accessory settings data 122. The trends identified in operation 404 can include one or more device trends, one or more user trends, one or more accessory trends, or the like. The trends have been illustrated and described in detail above with reference to FIG. 1. Briefly, however, trends can be detected to indicate how a particular accessory 110 is adjusted or interacted with by one or more users or devices; how a particular user interacts with multiple accessories 110; and/or how accessories 110 in communication with a particular device may be adjusted or interacted with by users or devices. Because other trends can be detected as illustrated and described herein, it should be understood that these examples are illustrative and therefore should not be construed as being limiting in any way.

From operation 404, the method 400 proceeds to operation 406. At operation 406, the server computer 120 can generate trend data 126 corresponding to the trends identified in operation 404. The trend data 126 can represent the trends and/or define the trends using code or data. Thus, for example, the trend data 126 can define a percentage, value, parameter, or the like for adjusting one or more aspects, options, or settings for the accessory 110. The trends can define user trends, device trends, or accessory trends as illustrated and described herein.

From operation 406, the method 400 proceeds to operation 408. At operation 408, the server computer 120 can store the trend data 126 generated in operation 406 and/or update accessory settings data 122 based upon the trends detected in operation 404 and/or the trend data 126 generated in operation 406. Thus, the accessory settings data 122 can be updated to reflect the trends detected in operation 404, in some embodiments. In some other embodiments, the trend data 126 can be stored with the accessory settings data 122. In some instances, the accessory settings data 122 also can be updated to reflect the most recent version of the accessory data 116. As such, settings or options represented by the accessory settings data 122 can include and/or can be based upon one or more trends as illustrated and described herein. It should be understood that this example is illustrative and therefore should not be construed as being limiting in any way.

From operation 408, the method 400 proceeds to operation 410. At operation 410, the server computer 120 can output the accessory settings data 122 and/or the trend data 126. The accessory settings data 122 and/or the trend data 126 can be output to one or more entities 130. As noted above, the entities 130 can include, for example, a manufacturer, retailer, or reseller associated with the device and/or the accessory; a network operator associated with the user or computing device 102; and/or other parties. It should be understood that the accessory setting service 118 can output the accessory settings data 122 and/or the trend data 126 to more than one entity 130.

From operation 410, the method 400 proceeds to operation 412. The method 400 ends at operation 412.

Figure 5A:
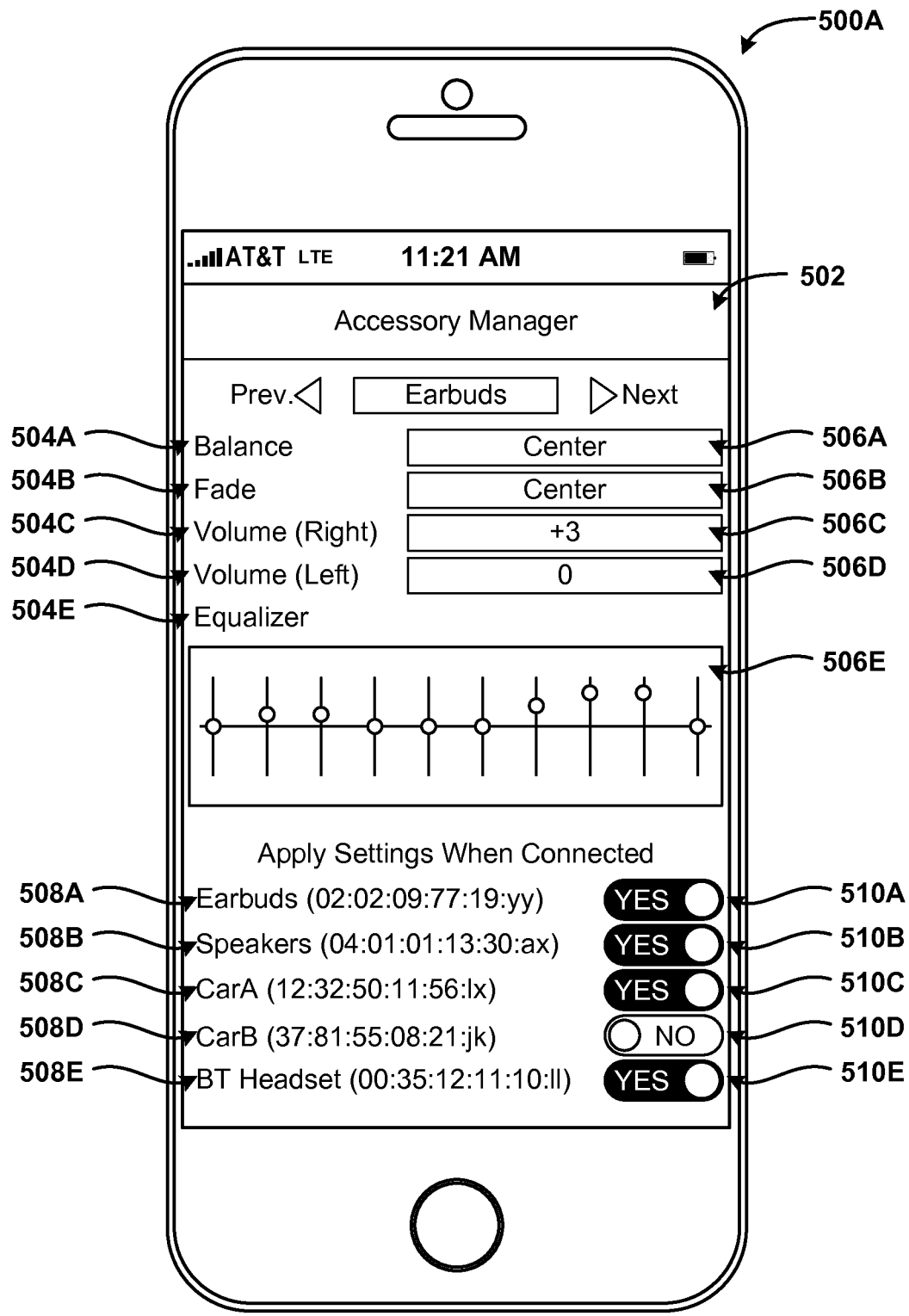
FIGS. 5A-5B are user interface diagrams showing various screen displays for interacting with an accessory setting application or accessory setting service, according to some illustrative embodiments of the concepts and technologies described herein.
Figure 5B:
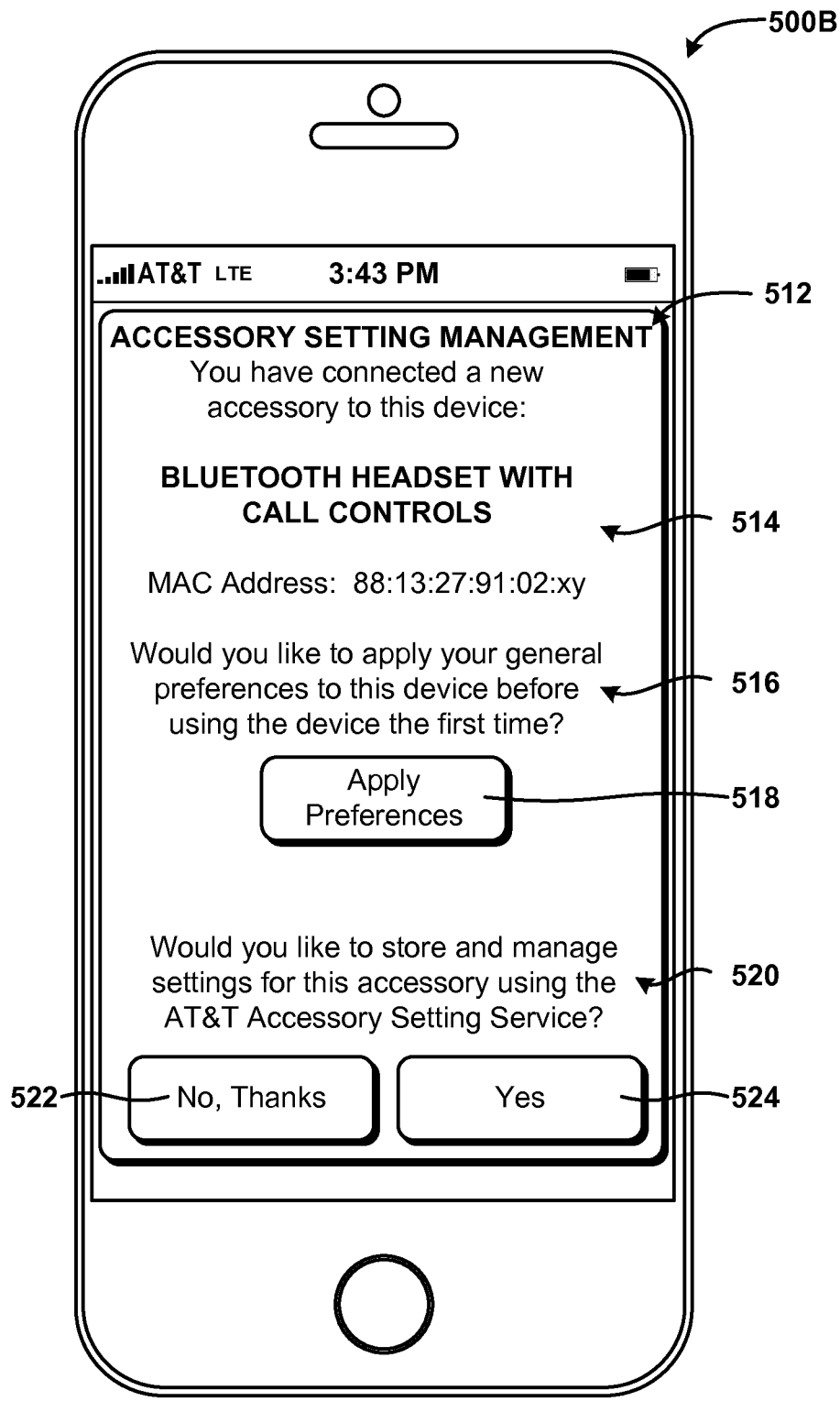

FIGS. 5A-5B are user interface ("UI") diagrams showing aspects of UIs for using an accessory setting service 118, according to some illustrative embodiments. FIG. 5A shows an illustrative screen display 500A, which can be generated by a device such as the computing device 102. According to various embodiments, the computing device 102 can generate the screen display 500A and/or other screen displays in conjunction with and/or based upon activation of the accessory setting application 108 and/or interactions with the accessory setting service 118 described herein. It should be appreciated that the UI diagram illustrated in FIG. 5A is illustrative of one contemplated example of the UIs that can be generated and/or displayed in accordance with the concepts and technologies disclosed herein, and therefore should not be construed as being limited in any way.

According to various embodiments, the screen display 500A can be presented, for example, in response to detecting selection of an option to manage one or more accessories 110 and/or settings for one or more accessories 110. The screen display 500A also (or alternatively) can be presented in response to detecting starting or activation of the accessory setting application 108 and/or an interaction with the accessory setting service 118, in response to detecting a first execution of or interaction with the accessory setting application 108 and/or the accessory setting service 118, in response to detecting communication with an accessory 110, other triggers or events, combinations thereof, or the like. Because the screen display 500A illustrated in FIG. 5A can be displayed at additional and/or alternative times, it should be understood that this example is illustrative and therefore should not be construed as being limiting in any way.

The screen display 500A can include various menus and/or menu options (not shown in FIG. 5A). The screen display 500A also can include an accessory options display 502. The accessory options display 502 can be configured to allow a user or other entity to control various options associated with an accessory 110, the accessory setting application 108, the accessory setting service 118, or the like. As shown in FIG. 5A, the accessory options display 502 can include a number of accessory settings 504A-E (hereinafter collectively and/or generically referred to as "accessory settings 504"). Each of the accessory settings 504 can have a corresponding accessory setting control 506A-E (hereinafter collectively and/or generically referred to as "accessory setting controls 506").

A user or other entity can interact with the accessory setting controls 506 to specify a relative or absolute value for the corresponding accessory settings 504. In the illustrated embodiment, the values associated with the accessory settings 504 can be set by dragging a finger along the accessory setting controls 506 to set a value of the corresponding accessory setting 504. For example, a user may drag a finger to the left or right on top of the accessory setting control 506A to set a balance audio setting for an accessory 110 from only the right to only the left. In the illustrated embodiment, the balance is set to the center. It should be understood that this example is illustrative and therefore should not be construed as being limiting in any way.

According to various embodiments, the accessory setting controls 506 can be replaced with fields, check boxes, dropdown boxes, and/or other controls for setting or controlling accessory settings. As such, it should be understood that various relative and/or absolute schemes or systems can be used to specify grades, weights, values, combinations thereof, or the like. Because various absolute and/or relative value schemes are possible and are contemplated, it should be understood that the above-mentioned ranking values and scales are illustrative and therefore should not be construed as being limiting in any way.

In the illustrated embodiment, the accessory setting control 506A can be used to set a balance control for an accessory 110; the accessory setting control 506B can be used to set a fade control for an accessory 110; the accessory setting control 506C can be used to set a right side volume for an accessory 110; the accessory setting control 506D can be used to set a left side volume for an accessory 110; and the accessory setting control 506E can be used to set equalization values for an accessory 110. Because additional and/or alternative accessory setting controls 506 can be included in the accessory options display 502, it should be understood that these examples are illustrative and therefore should not be construed as being limiting in any way.

The accessory options display 502 also can be configured to allow a user or other entity to control various accessory options, some illustrative examples of which are shown in FIG. 5A. In particular, as shown in FIG. 5A, the accessory options display 502 can include a number of accessory identifiers 508A-E (hereinafter collectively and/or generically referred to as "accessory identifiers 508"). Each of the accessory identifiers 508 can have a corresponding UI control 510A-E (hereinafter collectively and/or generically referred to as "UI controls 510") for enabling and/or disabling application of accessory settings to an accessory 110 indicated by the accessory identifiers 508. It should be understood that this example is illustrative and therefore should not be construed as being limiting in any way.

A user or other entity can interact with the UI controls 510 to specify a binary yes/no, true/false, activated/inactivated, or other indicator for a corresponding accessory identifier 508. In some embodiments, the binary setting can be replaced with or supplemented by a multi-faceted response field, for example a drop down list that can include two or more choices. For example, the "earbuds" accessory identifier 508A can have a dropdown list of settings instead of the illustrated UI control 510A. The dropdown list or other control can include settings of "always," "never," "sometimes," or other options such as threshold amounts where the always or never settings apply, or other options. Thus, while in the illustrated embodiment, the UI controls 510 can provide a binary setting for selection by the user or other entity, it should be understood that this example is illustrative and therefore should not be construed as being limiting in any way.

In the illustrated embodiment, the UI control 510A can be used to activate or deactivate an option to apply stored accessory settings to an accessory indicated by the accessory identifier 508A when the accessory 110 is connected to the computing device 102; the UI control 510B can be used to activate or deactivate an option to apply stored accessory settings to an accessory indicated by the accessory identifier 508B when the accessory 110 is connected to the computing device 102; the UI control 510C can be used to activate or deactivate an option to apply stored accessory settings to an accessory indicated by the accessory identifier 508C when the accessory 110 is connected to the computing device 102; the UI control 510D can be used to activate or deactivate an option to apply stored accessory settings to an accessory indicated by the accessory identifier 508D when the accessory 110 is connected to the computing device 102; and the UI controls 510E can be used to activate or deactivate an option to apply stored accessory settings to an accessory indicated by the accessory identifier 508E when the accessory 110 is connected to the computing device 102. Because additional and/or alternative UI controls 510 can be included in the accessory options display 502, it should be understood that these examples are illustrative and therefore should not be construed as being limiting in any way.

Referring now to FIG. 5B, a UI diagram showing additional aspects of the concepts and technologies disclosed herein for providing an accessory setting service 118 is described in detail. In particular, FIG. 5B shows an illustrative screen display 500B, which can be generated by a device such as the computing device 102. As indicated above with reference to FIG. 5A, the screen display 500B can be generated by the computing device 102 via execution of the accessory setting application 108 and/or via interactions with the accessory setting service 118, in some embodiments. It should be appreciated that the UI diagram illustrated in FIG. 5B is illustrative of one contemplated example of the UIs that can be generated and/or displayed in accordance with the concepts and technologies disclosed herein, and therefore should not be construed as being limited in any way.

The screen display 500B can include an accessory management display 512. The accessory management display 512 can be used to control an accessory 110 using the accessory setting application 108; to apply accessory settings to the accessory 110 using the accessory setting application 108; to capture and/or store settings associated with the accessory using the accessory setting application 108; and/or for other interactions with the accessory 110 and/or the accessory setting application 108. The accessory management display 512 can indicate, to a user, that a new accessory 110 has been detected in communication with the computing device 102 and/or other device that executes the accessory setting application 108. It should be understood that a "new" accessory 110 can refer to an accessory 110 not previously connected to the computing device 102; an accessory 110 not previously controlled by the accessory setting application 108; an accessory 110 for which control by the accessory setting application 108 has been discontinued or suspended; combinations thereof; or the like.

The accessory management display 512 can include identifying information 514 that can identify the type, name, or other information associated with the accessory 110. The identifying information 514 can be used by the user or other entity to confirm that the accessory 110 for which settings are to be captured and/or applied is an accessory 110 the entity owns, is in control over, or the like. Although not required, the identifying information also can include a MAC address or other unique identifier for the accessory 110. This information can be used by a user or other entity for verification purposes and/or for other reasons.

The accessory management display 512 also can include an apply preferences prompt 516. The apply preferences prompt 516 can prompt a user to indicate whether or not he or she wants to apply existing preferences to the accessory 110. Existing preferences can include, for example, a user's preferences, which can be determined by the accessory setting service 118 as described above and/or specified by a user. Thus, it should be understood that the user's preferences can correspond to one or more determined user trends as illustrated and described above with reference to FIG. 1, though this is not necessarily the case. The user's preferences can include, for example, an indication that the user generally adjusts a volume of one ear a particular percent over the other ear, that the user prefers a particular balance or fade range, that the user generally applies a particular equalization, combinations thereof, or the like. Thus, an accessory 110 can be pre-adjusted by the accessory setting application 108 based upon a user's settings, preferences, and/or interactions with other accessories 110. It should be understood that this example is illustrative and therefore should not be construed as being limiting in any way.

The existing preferences also can be associated with a manufacturer of the accessory 110, a model of the accessory 110, or the like, as illustrated and described above with reference to accessory trends, device trends, or the like. Thus, for example, if the accessory setting service 118 determines, based upon an analysis of the accessory settings data 122, that the average user boosts volume by a particular amount, percentage, or the like, the accessory setting service 118 can generate an indication to this effect and provide that information to the computing device 102 as an existing preference and/or as part of the settings data 128. Thus, an accessory 110 can be pre-adjusted by the accessory setting application 108 based upon other users' settings, preferences, and/or interactions with similar or identical accessories 110. It should be understood that this example is illustrative and therefore should not be construed as being limiting in any way.

The accessory management display 512 also can include an apply preferences control 518. Upon selecting the apply preferences control 518, the accessory setting application 108 can take an action that corresponds to the apply preferences prompt 516. Thus, the accessory setting application 108 can apply one or more existing preferences which, as explained above, can be based upon a user's settings, preferences, and/or interactions with other accessories 110, as well as other users' interactions with accessories 110.

The accessory management display 512 also can include an accessory setting service prompt 520. The accessory setting service prompt 520 can prompt a user to indicate whether or not he or she wants to save settings and/or information that identifies the accessory 110 at the accessory setting service 118. The accessory setting service prompt 520 can be used to determine if a user wants to save settings associated with the accessory 110 for future use. It can be appreciated that if the accessory 110 is not owned by the user or other entity, future use of the settings associated with the accessory 110 may not be desired.

The accessory management display 512 can include a UI control 522 for declining the option to save settings and/or information that identifies the accessory 110 at the accessory setting service 118. The accessory management display 512 also can include a UI control 524 selecting the option to save settings and/or information that identifies the accessory 110 at the accessory setting service 118. Because the settings also can be saved at the computing device 102 or other device that executes the accessory setting application 108, it should be understood that this example is illustrative and therefore should not be construed as being limiting in any way.

Figure 6:
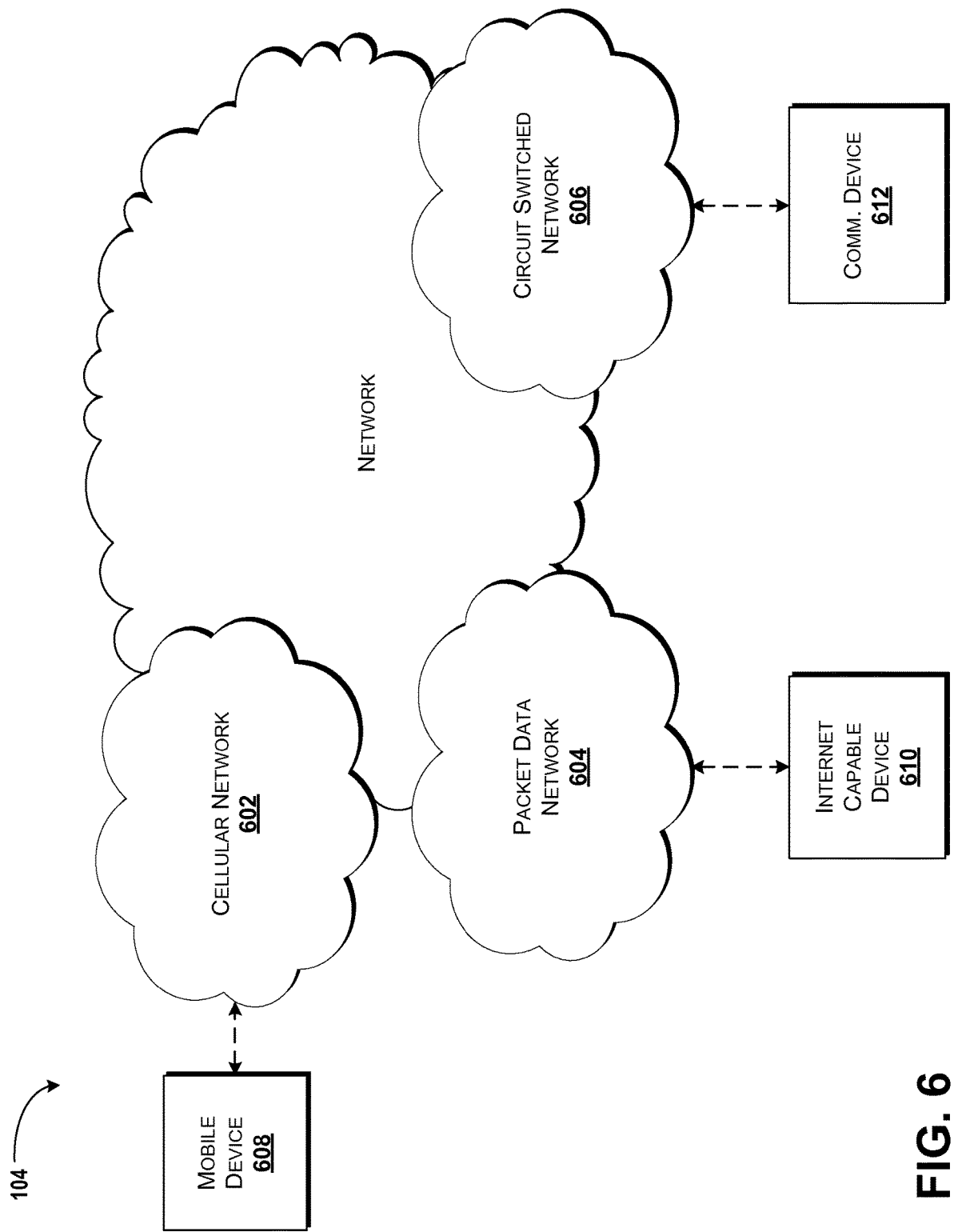
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
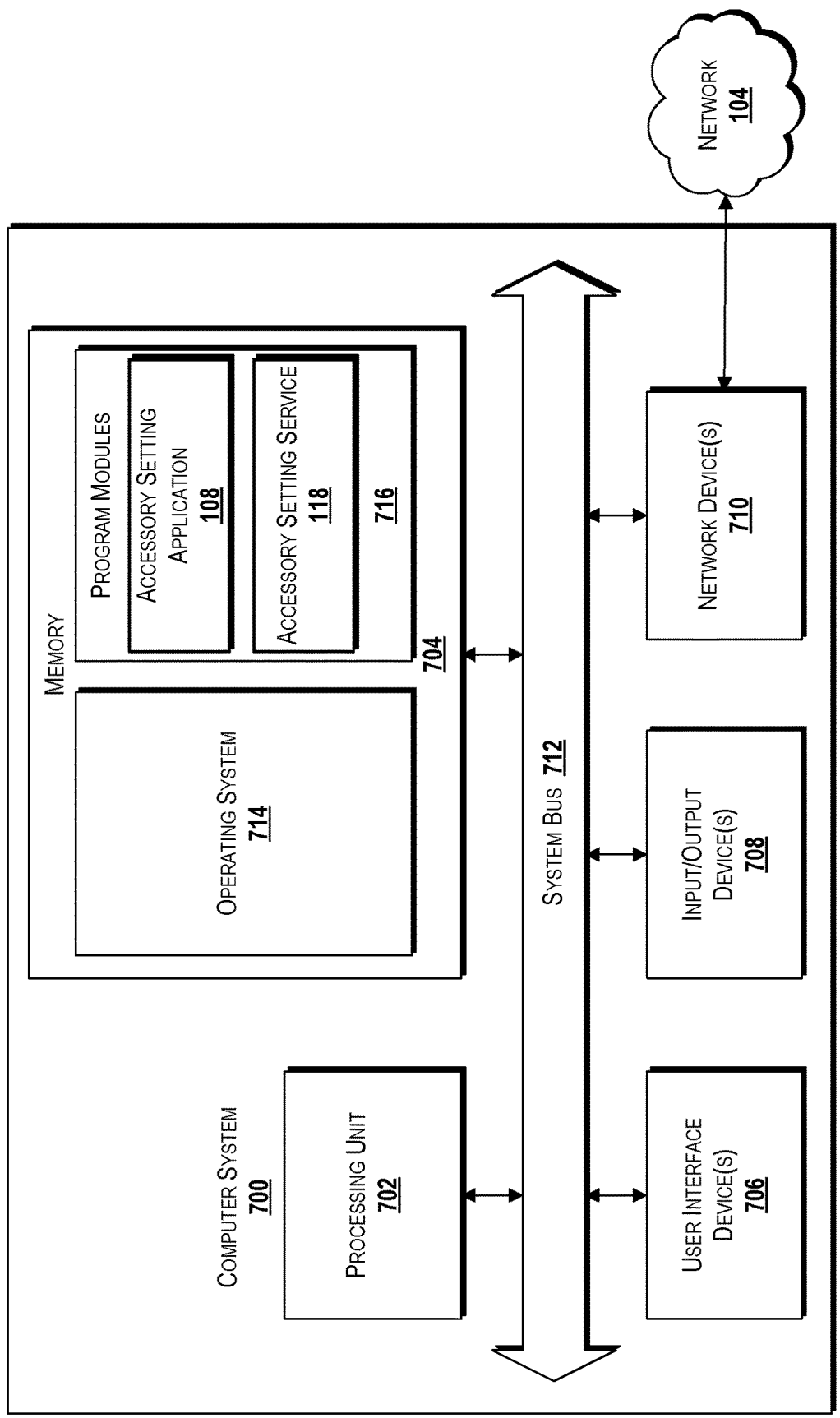
FIG. 7 is a block diagram illustrating an example computer system configured to interact with or provide an accessory setting service, according to some illustrative embodiments of the concepts and technologies described herein.

FIG. 7 is a block diagram illustrating a computer system 700 configured to provide the functionality described herein for an accessory setting service, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the accessory setting application 108 and/or the accessory setting service 118. These and/or other programs can be embodied in computer-readable media containing instructions that, when executed by the processing unit 702, perform one or more of the methods 200, 300, 400 described in detail above with respect to FIGS. 2-4. According to embodiments, the program modules 716 may be embodied in hardware, software, firmware, or any combination thereof. Although not shown in FIG. 7, it should be understood that the memory 704 also can be configured to store the accessory data 116, the accessory settings data 122, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
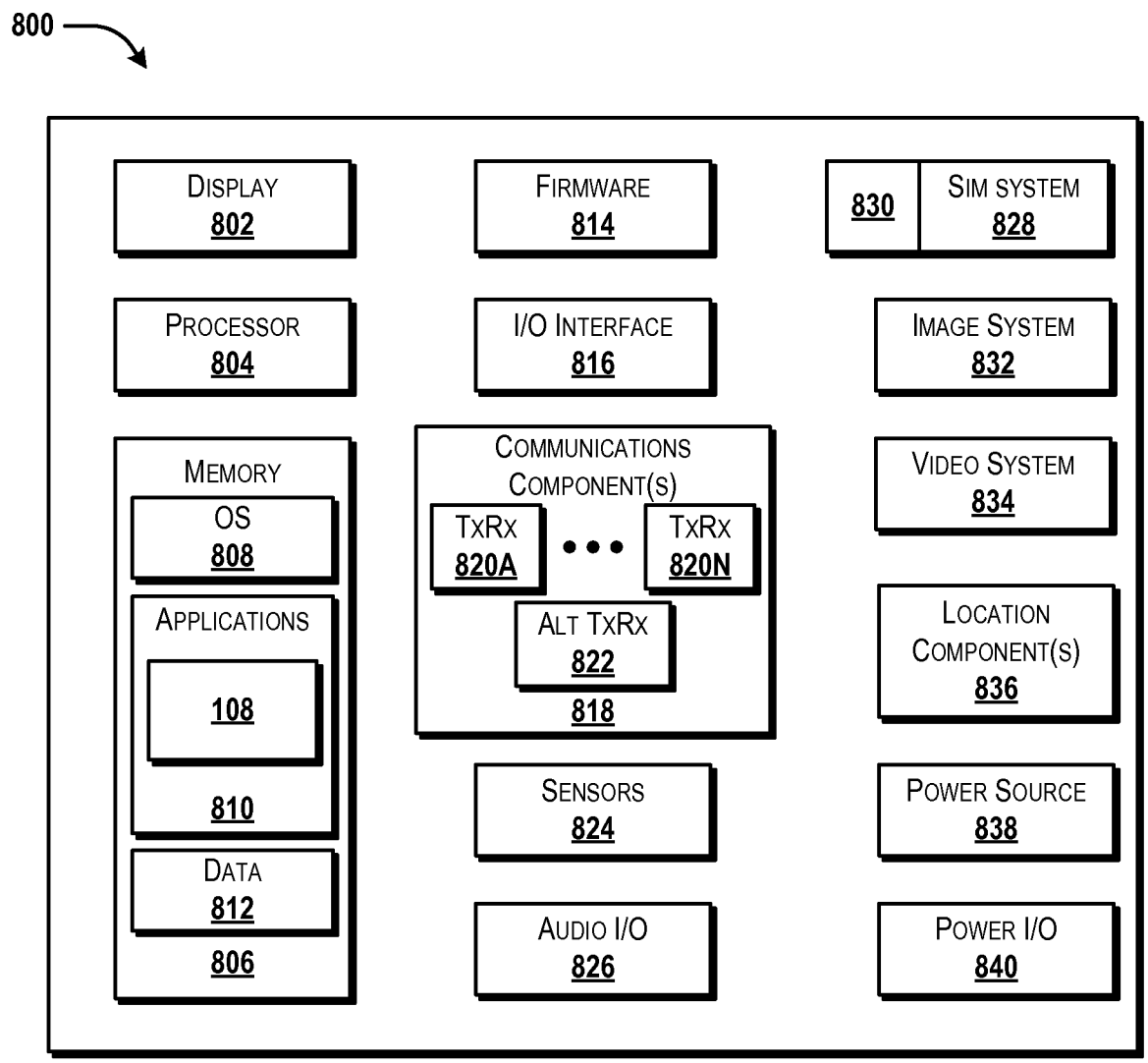
FIG. 8 is a block diagram illustrating an example mobile device configured to interact with an accessory setting application or accessory setting service, according to some illustrative embodiments of the concepts and technologies described herein.

Turning now to FIG. 8, an illustrative mobile device 800 and components thereof will be described. In some embodiments, the computing device 102 described above with reference to FIGS. 1-5B can be configured as and/or can have an architecture similar or identical to the mobile device 800 described herein in FIG. 8. It should be understood, however, that the computing device 102 may or may not include the functionality described herein with reference to FIG. 8. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements for configuring settings or options for an accessory 110, configuring options or settings for the accessory setting application 108 and/or the accessory setting service 118, pairing a device with an accessory 110, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the accessory setting application 108, the accessory setting service 118, other computer-executable instructions stored in a memory 806, or the like. In some embodiments, the applications 810 also can include a UI application (not illustrated in FIG. 8).

The UI application can interface with the operating system 808, such as the operating system 106 shown in FIG. 1, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, designating and/or setting preferences or options, creating accessory settings, adjusting settings for an accessory, configuring other settings, manipulating address book content and/or settings, multimode interactions, interacting with other applications 810, and otherwise facilitating user interaction with the operating system 808, the applications 810, and/or other types or instances of data 812 that can be stored at the mobile device 800.

The data 812 can include, for example, accessory data 116, accessory settings data 122, and/or various applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, accessory settings, accessory names and/or addresses, preferences and/or settings, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system ("image system") 832. The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Based on the foregoing, it should be appreciated that systems and methods for providing and/or interacting with an accessory setting service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
    detecting, at a mobile device comprising a processor that executes an accessory setting application, a presence of an audio accessory in a proximity of the mobile device, wherein detecting the presence of the audio accessory comprises detecting a communication between the mobile device and the audio accessory;
    pairing, by the mobile device, with the audio accessory to establish a peer-to-peer wireless communication link between the audio accessory and the mobile device, wherein the audio accessory communicates with the mobile device using a wireless peer-to-peer protocol;
    identifying, by the processor, a unique identifier associated with the audio accessory, wherein the mobile device receives the unique identifier from the audio accessory via the peer-to-peer wireless communication link between the mobile device and the audio accessory, and wherein the unique identifier comprises a media access control address for the audio accessory;
    accessing, by the processor and using the unique identifier, an indicator that is stored at the mobile device;
    determining, by the mobile device and based on the indicator, if audio settings for the audio accessory are stored at the mobile device;
    in response to determining that the audio settings for the audio accessory are not stored at the mobile device, transmitting, by the mobile device and to an accessory settings service at a server computer, the unique identifier to determine if the audio settings for the audio accessory are stored at the accessory settings service, wherein the accessory settings service sends the audio settings to the mobile device in response to receiving the unique identifier, wherein the audio settings comprise the unique identifier, a balance setting for the audio accessory, an equalizer settings for the audio accessory, and a volume setting for the audio accessory, wherein the accessory settings service receives the unique identifier, and determines if the audio accessory corresponds to a new audio accessory, wherein if the accessory settings service makes a first determination that the audio accessory does not correspond to the new audio accessory, the accessory settings service obtains the audio settings associated with the unique identifier and transmits the audio settings to the mobile device, and wherein if the accessory settings service makes a second determination that the audio accessory corresponds to the new audio accessory, the accessory settings service identifies accessory settings represented by accessory data, stores accessory settings data that represents the accessory settings, analyzes the accessory settings data, identifies a device trend associated with the audio accessory based on the accessory settings data, the device trend defining accessory settings used for the audio accessory when the audio accessory is interacted with by multiple users of the mobile device, generates trend data that represents the device trend, and updates, on the mobile device and in the accessory settings service, the accessory settings data based on the device trend;
    applying, by the mobile device, the audio settings for the audio accessory;
    presenting, at the mobile device, a user interface for adjusting the audio settings for the audio accessory, the user interface comprising a first option to adjust the volume setting for the audio accessory, a second option to adjust the balance setting for the audio accessory, and a third option to adjust the equalizer settings for the audio accessory;
    storing, at the mobile device, the unique identifier and adjusted audio settings defined using the user interface; and
    sending, by the mobile device and directed to the accessory settings service, the adjusted audio settings with the unique identifier for storage at the accessory settings service.

2. The method of claim 1, wherein the accessory settings data includes user trends or accessory trends.

3. The method of claim 1, further comprising identifying a manufacturer of the audio accessory.

4. The method of claim 1, wherein the mobile device comprises a smartphone, and wherein the audio settings comprise the volume setting.

5. The method of claim 1, wherein storing the audio settings comprises:
    generating accessory data comprising the unique identifier, the volume setting, and the balance setting; and
    transmitting the accessory data to the accessory settings service.

6. The method of claim 1, wherein the audio accessory comprises a headset for the mobile device.

7. A device comprising:
    a processor; and
    a memory that stores computer-executable instructions that, when executed by the processor, cause the processor to perform operations comprising
    detecting a presence of an audio accessory in a proximity of a mobile device, wherein detecting the presence of the audio accessory comprises detecting a communication between the mobile device and the audio accessory, pairing with the audio accessory to establish a peer-to-peer wireless communication link between the audio accessory and the mobile device, wherein the audio accessory communicates with the mobile device using a wireless peer-to-peer protocol, identifying a unique identifier associated with the audio accessory, wherein the mobile device receives the unique identifier from the audio accessory via the peer-to-peer wireless communication link between the mobile device and the audio accessory, and wherein the unique identifier comprises a media access control address for the audio accessory, accessing, using the unique identifier, an indicator that is stored at the mobile device determining, based on the indicator, if audio settings for the audio accessory are stored at the mobile device, in response to determining that the audio settings for the audio accessory are not stored at the mobile device, transmitting, to an accessory settings service at a server computer, the unique identifier to determine if the audio settings for the audio accessory are stored at the accessory settings service, wherein the accessory settings service sends the audio settings to the mobile device in response to receiving the unique identifier, wherein the audio settings comprise the unique identifier, a balance setting for the audio accessory, an equalizer settings for the audio accessory, and a volume setting for the audio accessory, wherein the accessory settings service receives the unique identifier, and determines if the audio accessory corresponds to a new audio accessory, wherein if the accessory settings service makes a first determination that the audio accessory does not correspond to the new audio accessory, the accessory settings service obtains the audio settings associated with the unique identifier and transmits the audio settings to the mobile device, and wherein if the accessory settings service makes a second determination that the audio accessory corresponds to the new audio accessory, the accessory settings service identifies accessory settings represented by accessory data, stores accessory settings data that represents the accessory settings, analyzes the accessory settings data, identifies a device trend associated with the audio accessory based on the accessory settings data, the device trend defining accessory settings used for the audio accessory when the audio accessory is interacted with by multiple users of the mobile device, generates trend data that represents the device trend, and updates, on the mobile device and in the accessory settings service, the accessory settings data based on the device trend, applying the audio settings for the audio accessory, presenting a user interface for adjusting the audio settings for the audio accessory, the user interface comprising a first option to adjust the volume setting for the audio accessory, a second option to adjust the balance setting for the audio accessory, and a third option to adjust the equalizer settings for the audio accessory, storing the unique identifier and adjusted audio settings defined using the user interface, and sending, directed to the accessory settings service, the adjusted audio settings with the unique identifier for storage at the accessory settings service.

8. The device of claim 7, wherein storing the audio settings comprises:

generating accessory data comprising the unique identifier, the volume setting, and the balance setting; and transmitting the accessory data to the accessory settings service.

9. The device of claim 7, wherein the mobile device comprises a smartphone, and wherein the audio settings comprise the volume setting.

10. The device of claim 7, wherein the audio accessory comprises a headset for the mobile device.

11. A computer storage medium having computer-executable instructions stored thereon that, when executed by a processor, cause the processor to perform operations comprising:

detecting a presence of an audio accessory in a proximity of a mobile device, wherein detecting the presence of the audio accessory comprises detecting a communication between the mobile device and the audio accessory;

pairing with the audio accessory to establish a peer-to-peer wireless communication link between the audio accessory and the mobile device, wherein the audio accessory communicates with the mobile device using a wireless peer-to-peer protocol;

identifying a unique identifier associated with the audio accessory, wherein the mobile device receives the unique identifier from the audio accessory via the peer-to-peer wireless communication link between the mobile device and the audio accessory, and wherein the unique identifier comprises a media access control address for the audio accessory;

accessing, using the unique identifier, an indicator that is stored at the mobile device;

determining, based on the indicator, if audio settings for the audio accessory are stored at the mobile device;

in response to determining that the audio settings for the audio accessory are not stored at the mobile device, transmitting, to an accessory settings service at a server computer, the unique identifier to determine if the audio settings for the audio accessory are stored at the accessory settings service, wherein the accessory settings service sends the audio settings to the mobile device in response to receiving the unique identifier, wherein the audio settings comprise the unique identifier, a balance setting for the audio accessory, an equalizer settings for the audio accessory, and a volume setting for the audio accessory, wherein the accessory settings service receives the unique identifier, and determines if the audio accessory corresponds to a new audio accessory, wherein if the accessory settings service makes a first determination that the audio accessory does not correspond to the new audio accessory, the accessory settings service obtains the audio settings associated with the unique identifier and transmits the audio settings to the mobile device, and wherein if the accessory settings service makes a second determination that the audio accessory corresponds to the new audio accessory, the accessory settings service identifies accessory settings represented by accessory data, stores accessory settings data that represents the accessory settings, analyzes the accessory settings data, identifies a device trend associated with the audio accessory based on the accessory settings data, the device trend defining accessory settings used for the audio accessory when the audio accessory is interacted with by multiple users of the mobile device, generates trend data that represents the device trend, and updates, on the mobile device and in the accessory settings service, the accessory settings data based on the device trend;

applying the audio settings for the audio accessory;

presenting a user interface for adjusting the audio settings for the audio accessory, the user interface comprising a first option to adjust the volume setting for the audio accessory, a second option to adjust the balance setting for the audio accessory, and a third option to adjust the equalizer settings for the audio accessory;

storing the unique identifier and adjusted audio settings defined using the user interface; and sending, directed to the accessory settings service, the adjusted audio settings with the unique identifier for storage at the accessory settings service.

12. The computer storage medium of claim 11, wherein storing the audio settings comprises:

generating accessory data comprising the unique identifier, the volume setting, and the balance setting; and transmitting the accessory data to the accessory settings service.

13. The computer storage medium of claim 11, wherein the audio accessory comprises a headset for the mobile device.

14. The computer storage medium of claim 11, wherein the mobile device comprises a smartphone, and wherein the audio settings comprise the volume setting.

* * * * *